Figure 1:
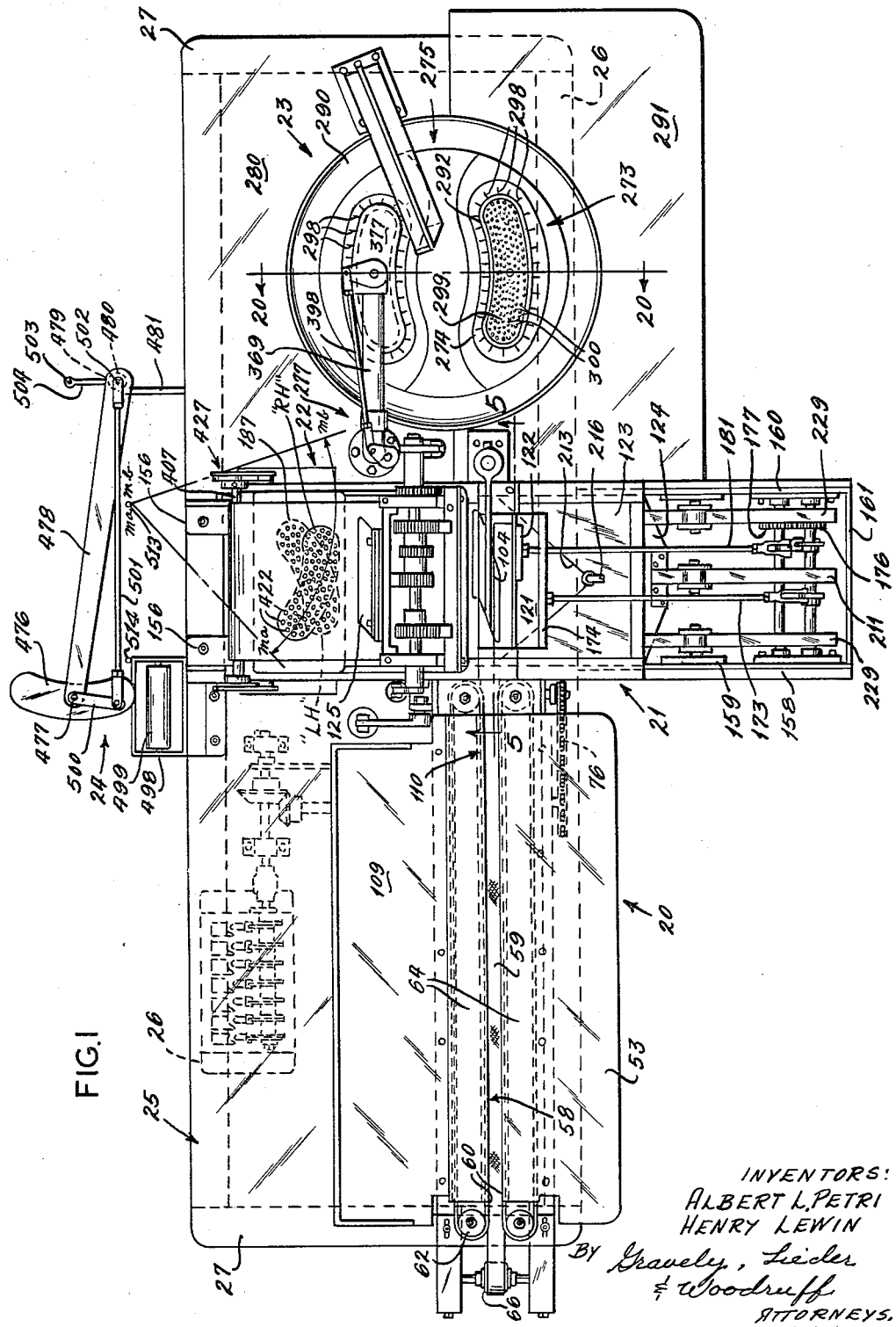

Oct. 1, 1963 A. L. PETRI ETAL 3,105,497
CIGAR MAKING MACHINE
Filed March 13, 1959 20 Sheets-Sheet 1

INVENTORS:
ALBERT L. PETRI
HENRY LEWIN
BY Gravely, Lieder
& Woodruff
ATTORNEYS.

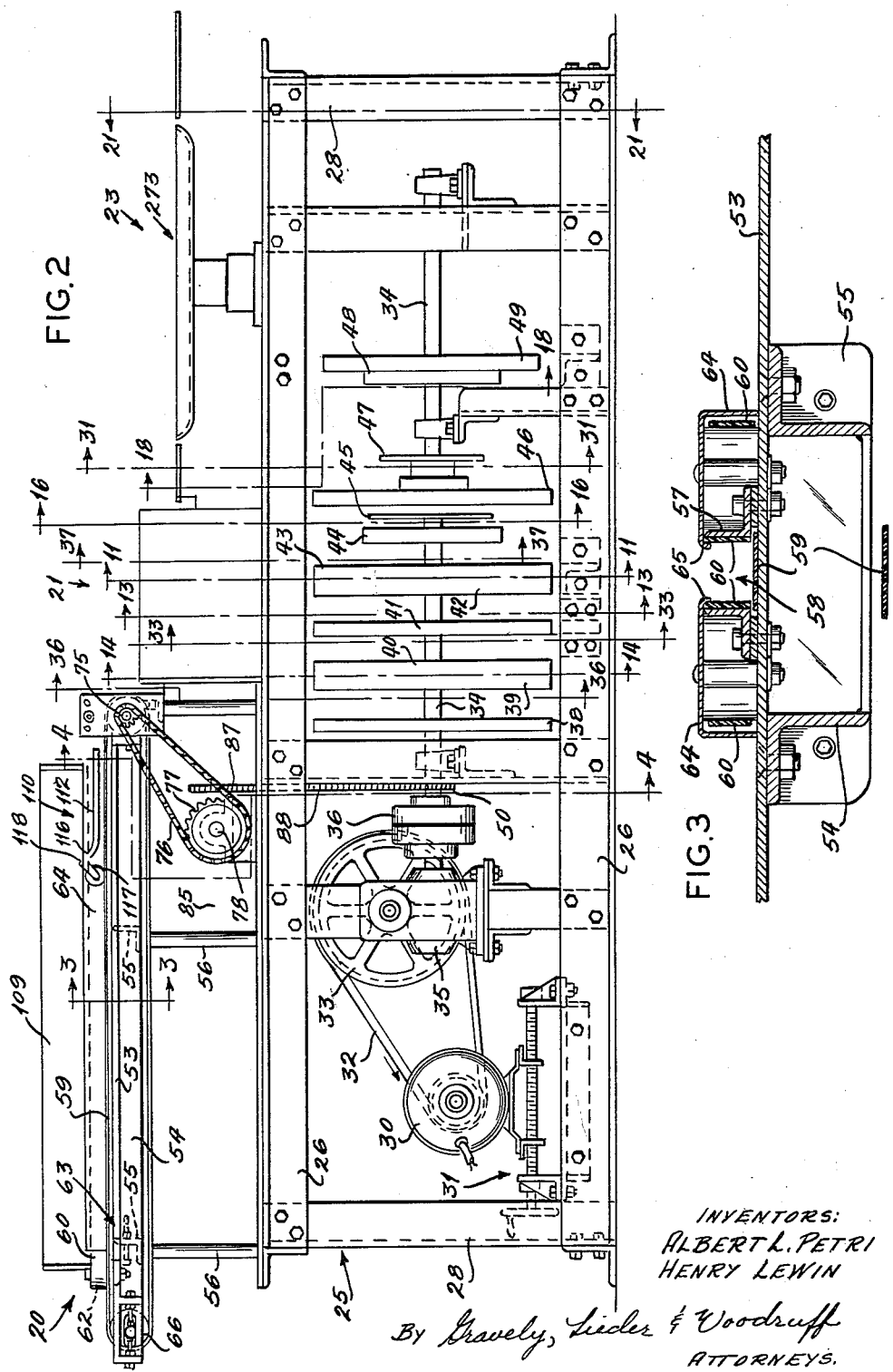

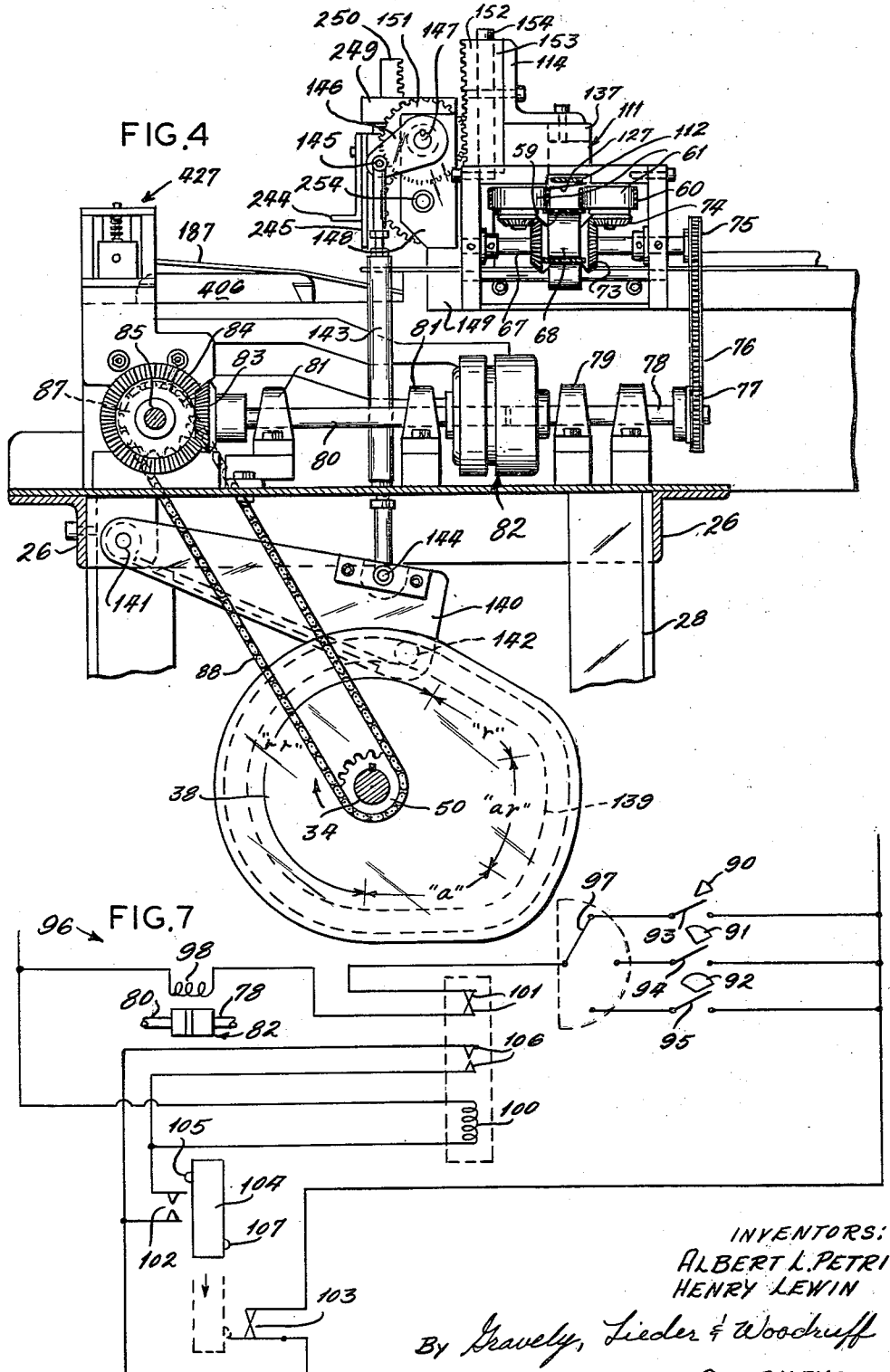

Oct. 1, 1963  A. L. PETRI ETAL  3,105,497
CIGAR MAKING MACHINE
Filed March 13, 1959  20 Sheets-Sheet 4
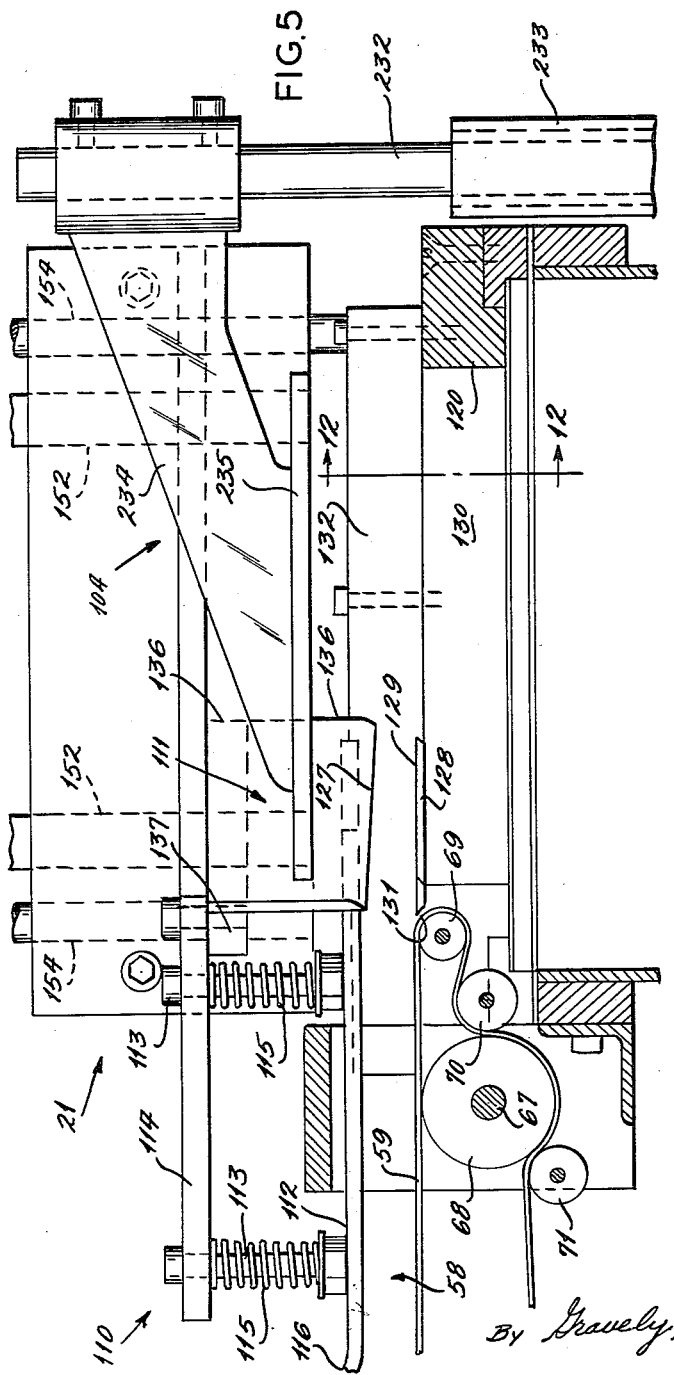
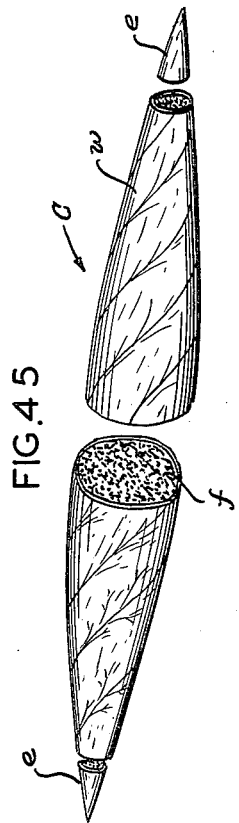
INVENTORS:
ALBERT L. PETRI
HENRY LEWIN
By Gravely, Lieder & Woodruff
ATTORNEYS.

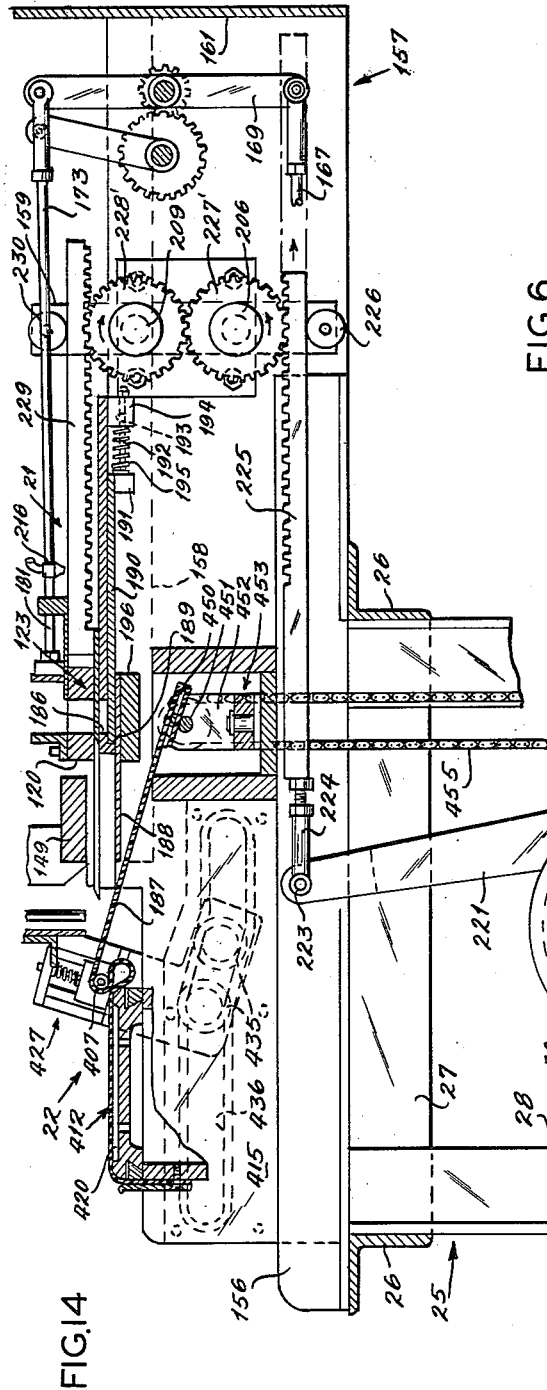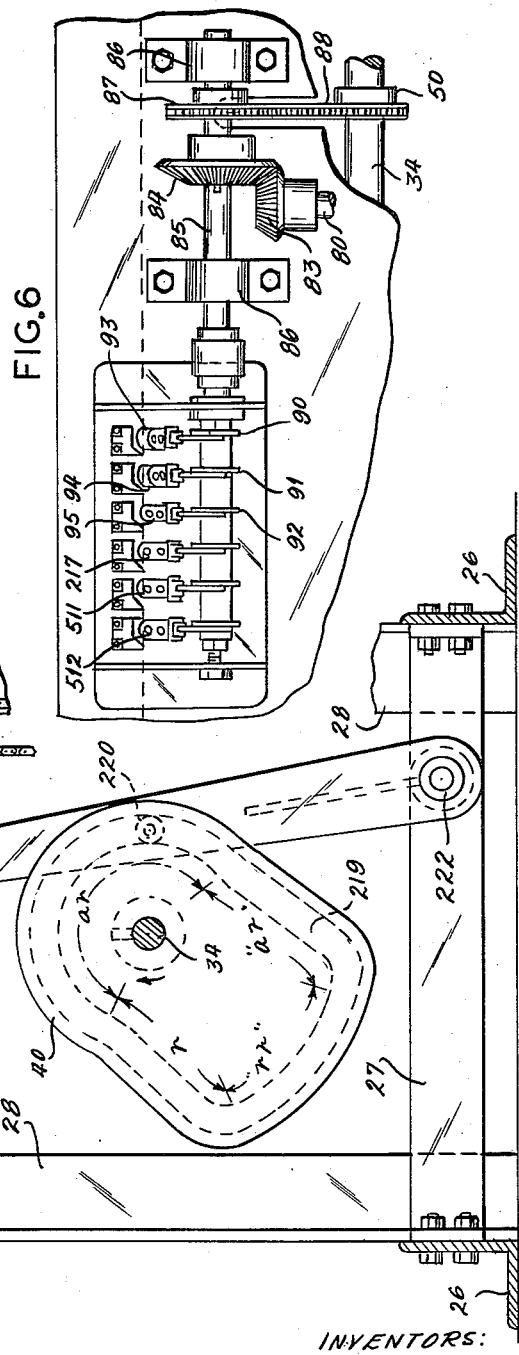

INVENTORS:
ALBERT L. PETRI
HENRY LEWIN

By Gravely, Lieder & Woodruff
ATTORNEYS.

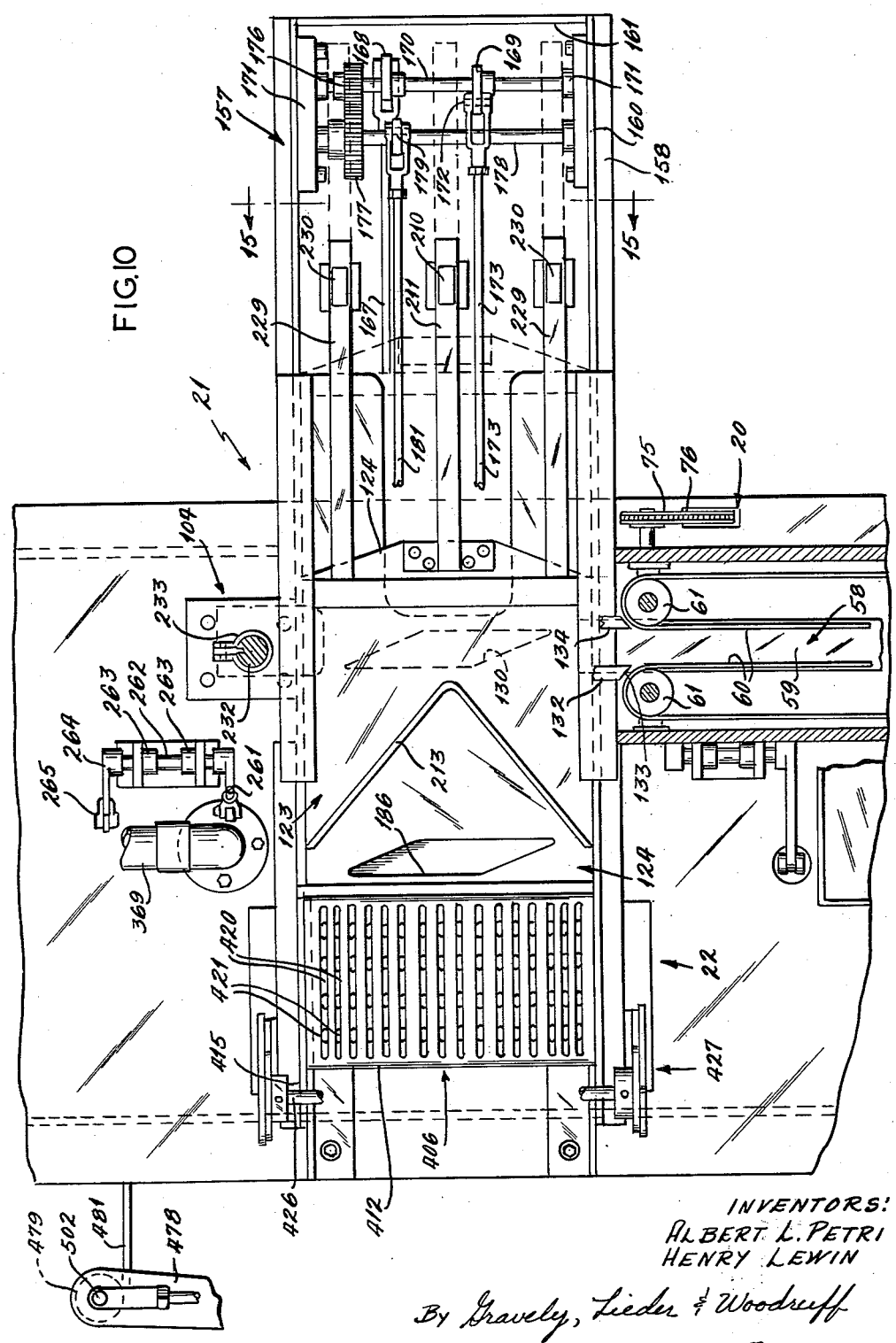

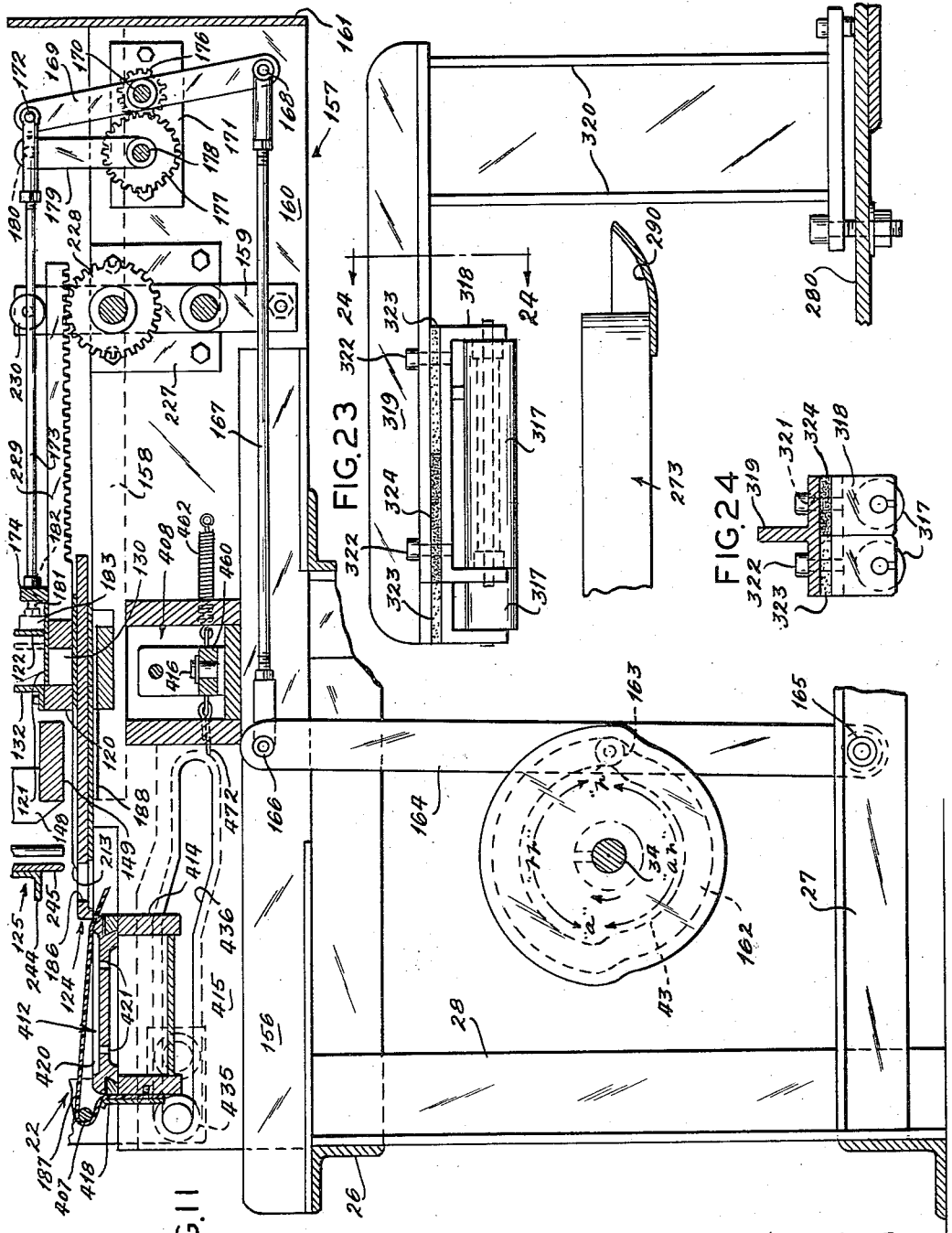

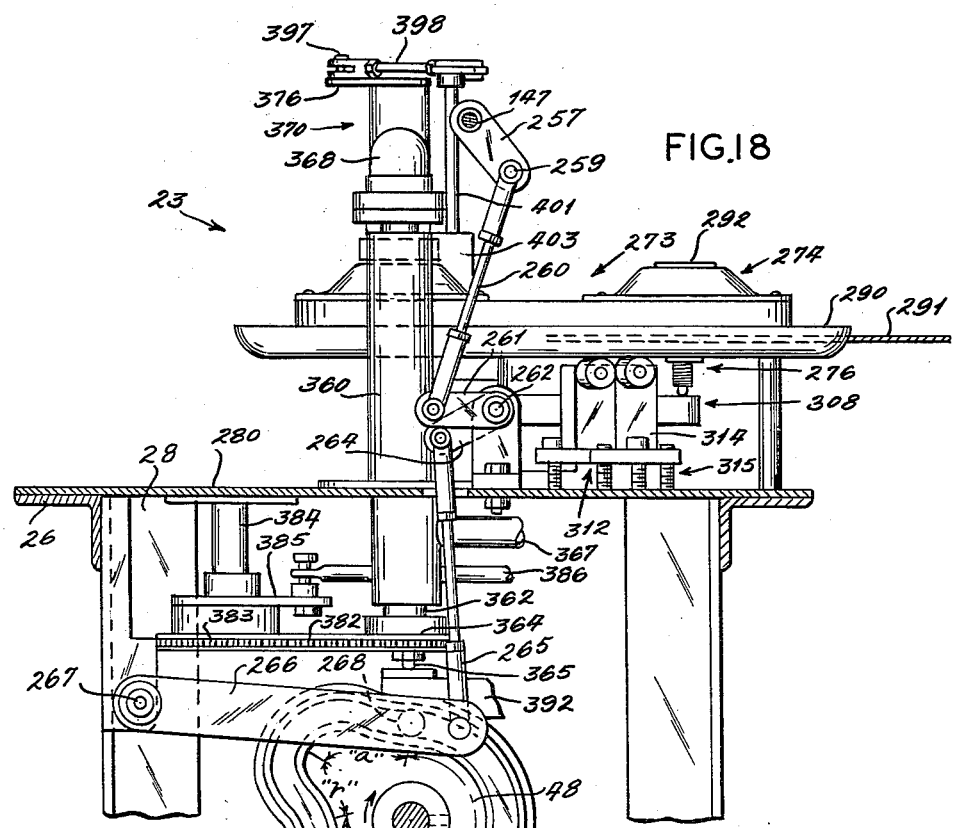
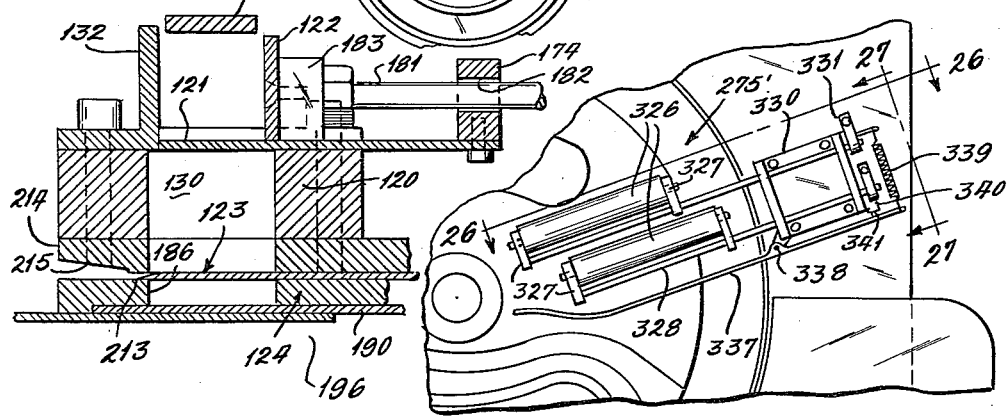

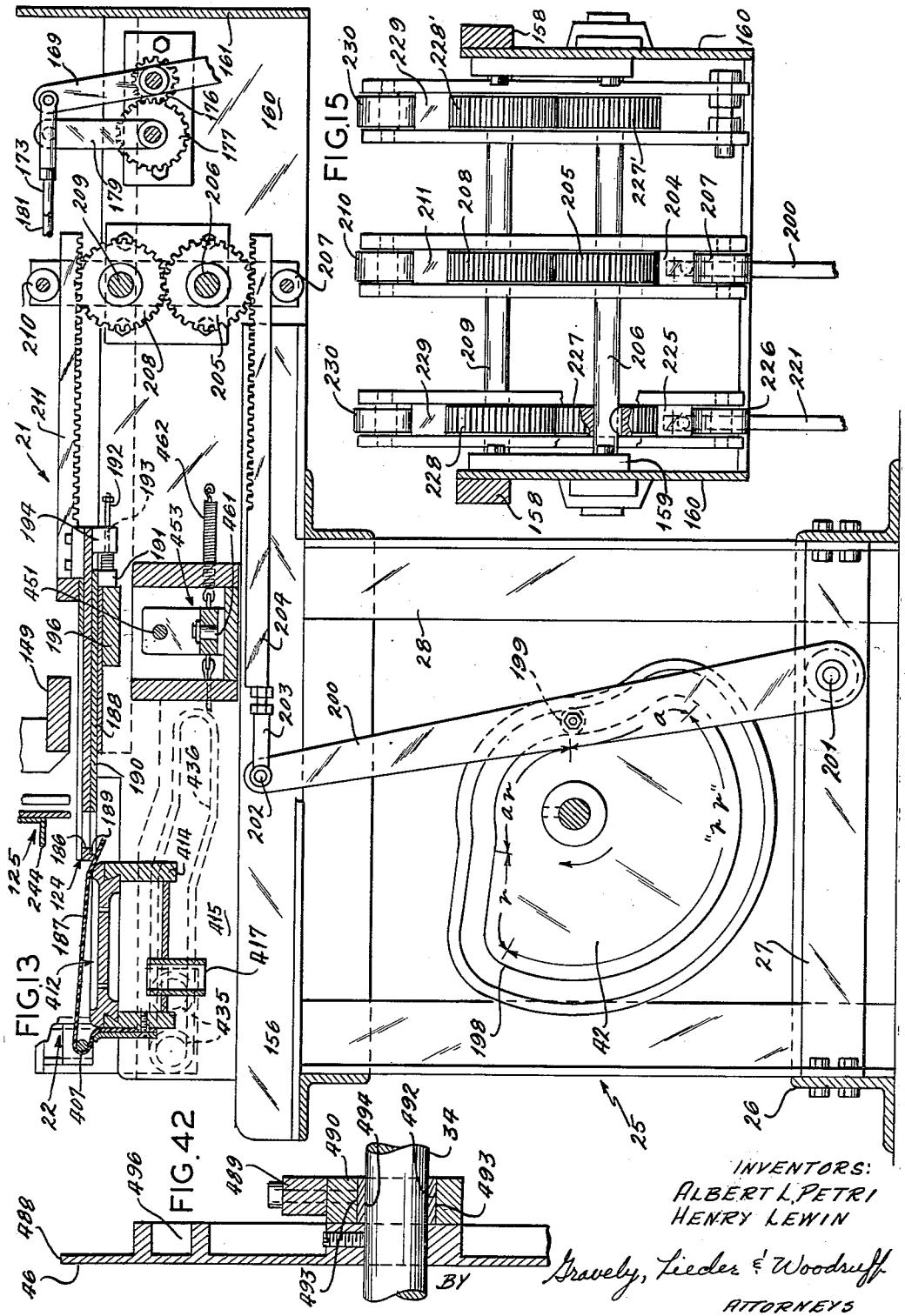

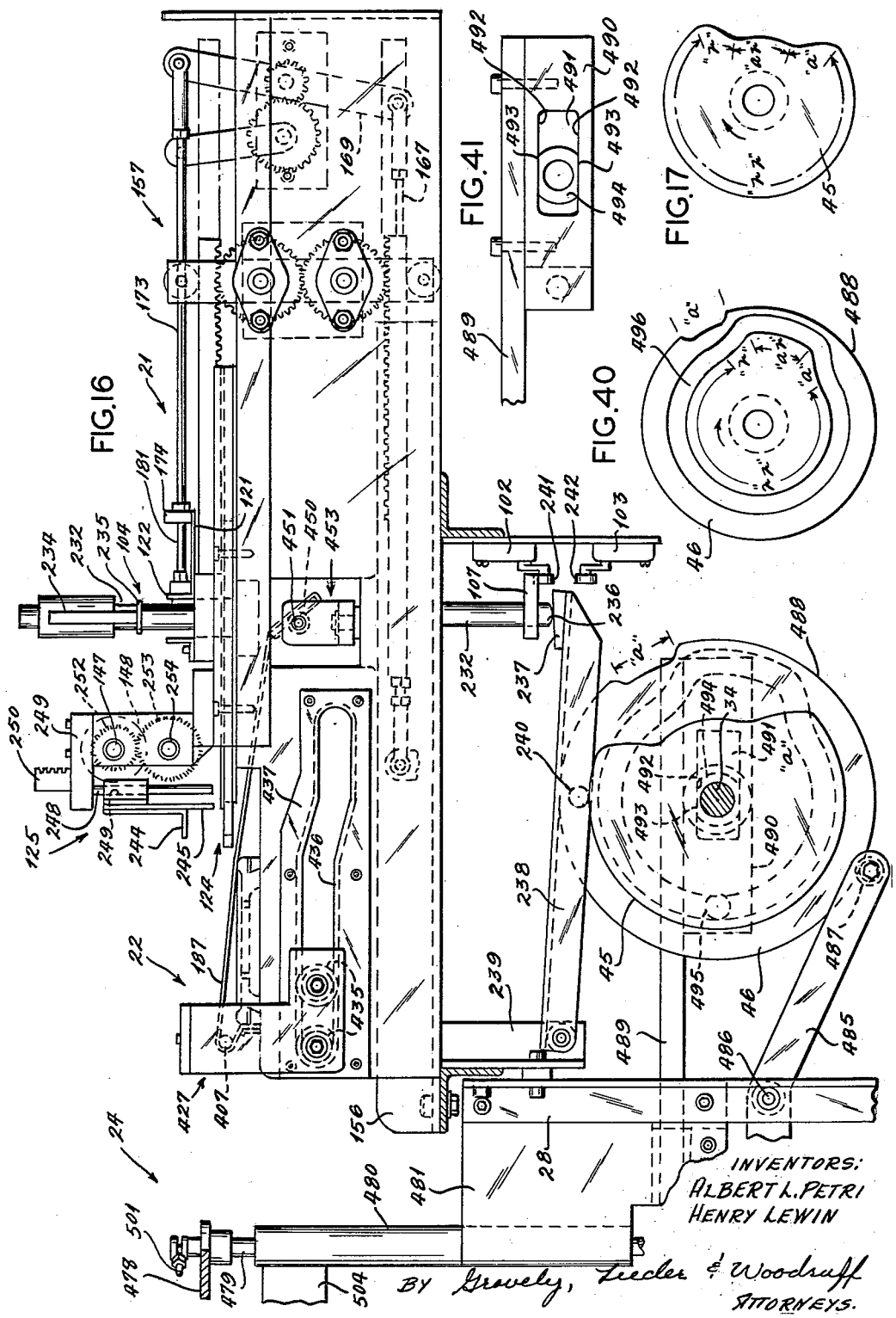

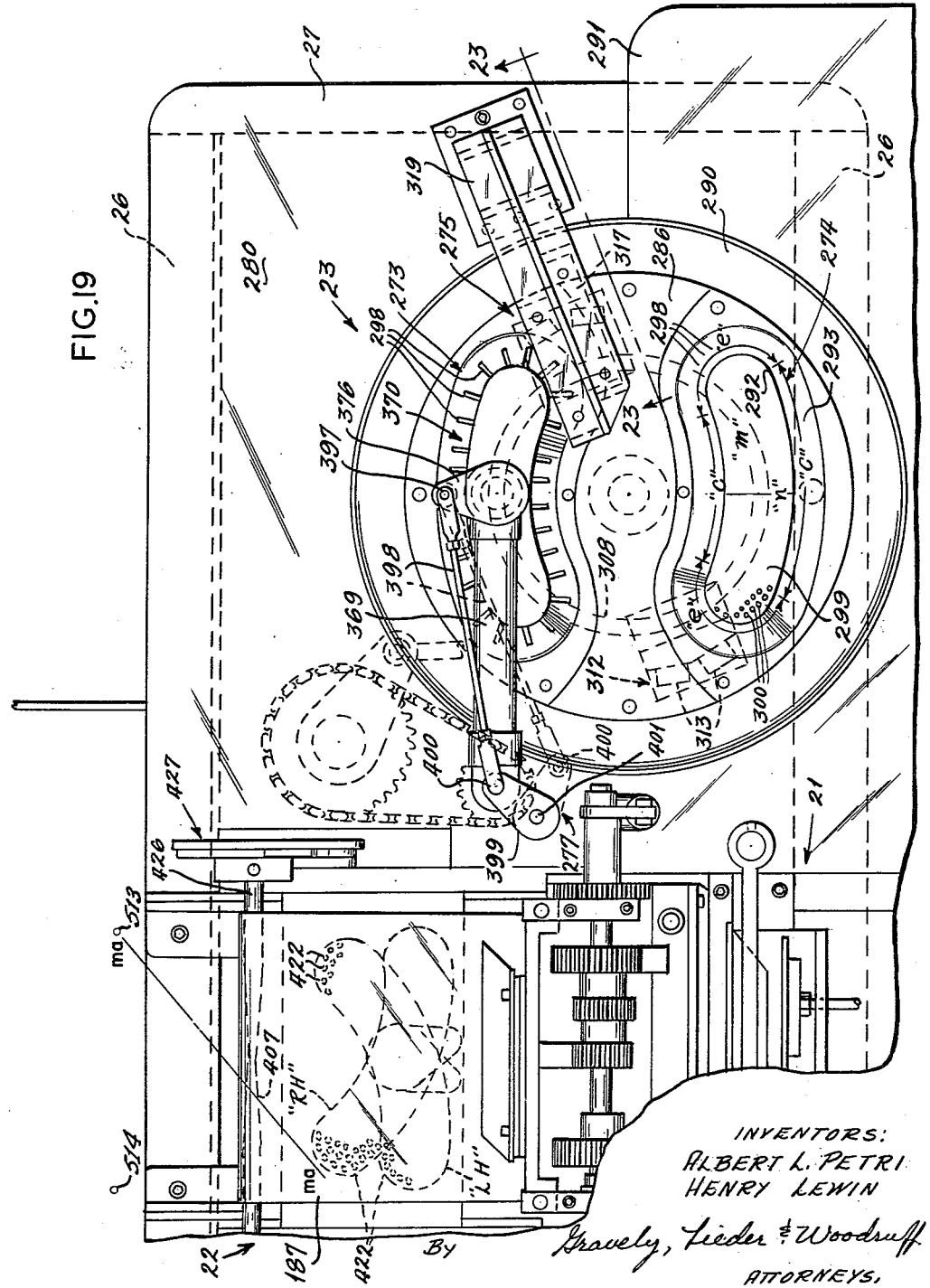

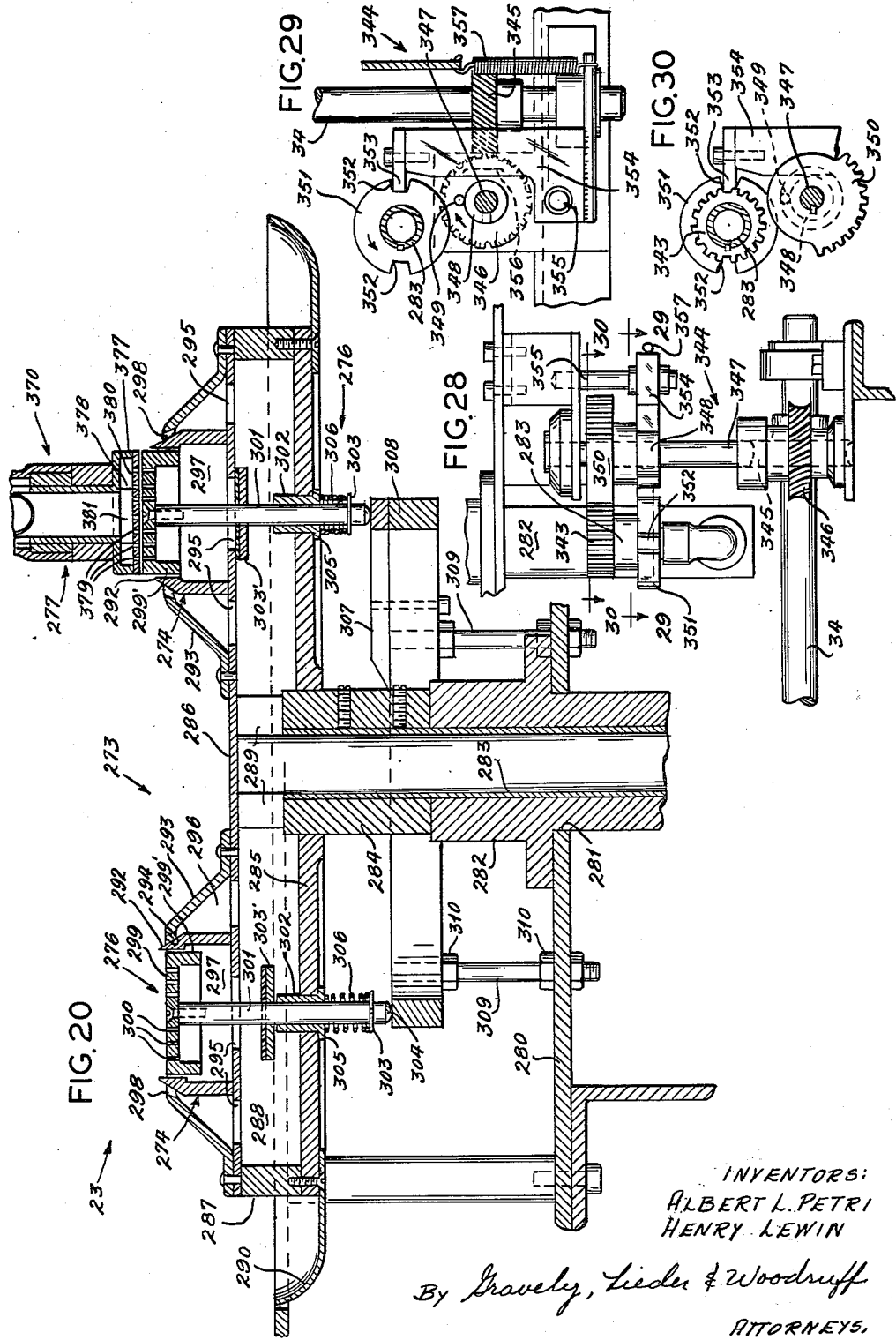

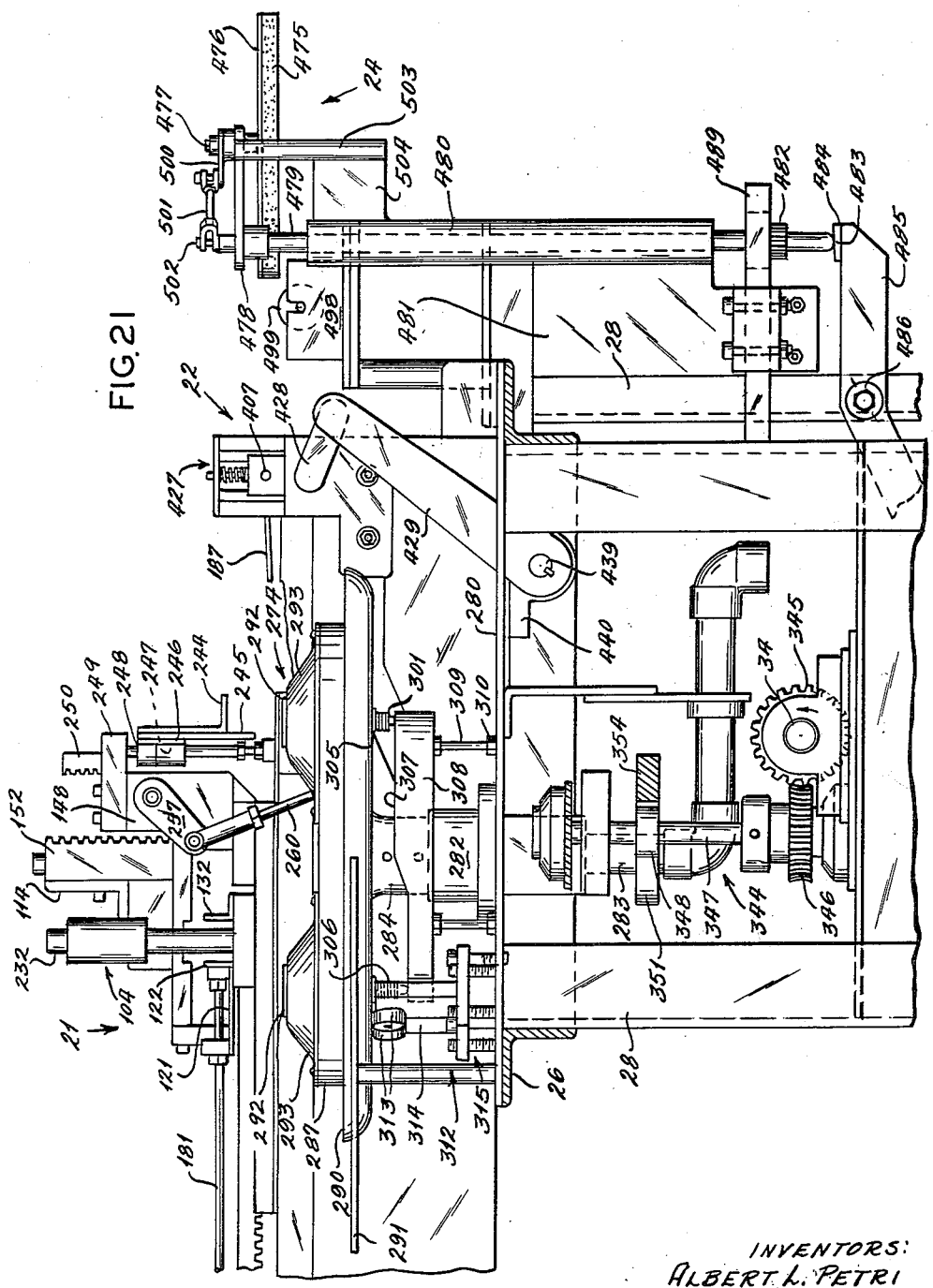

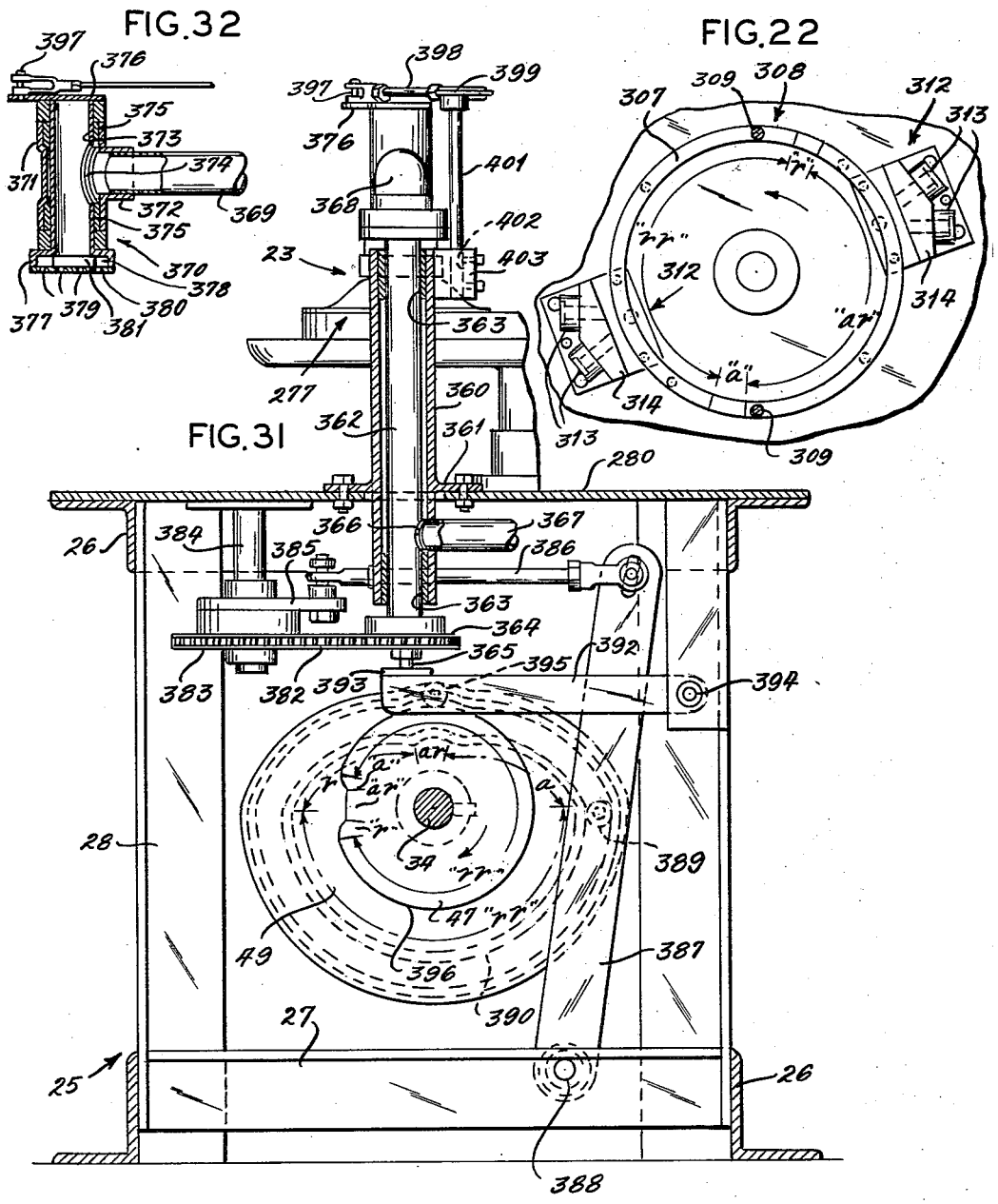

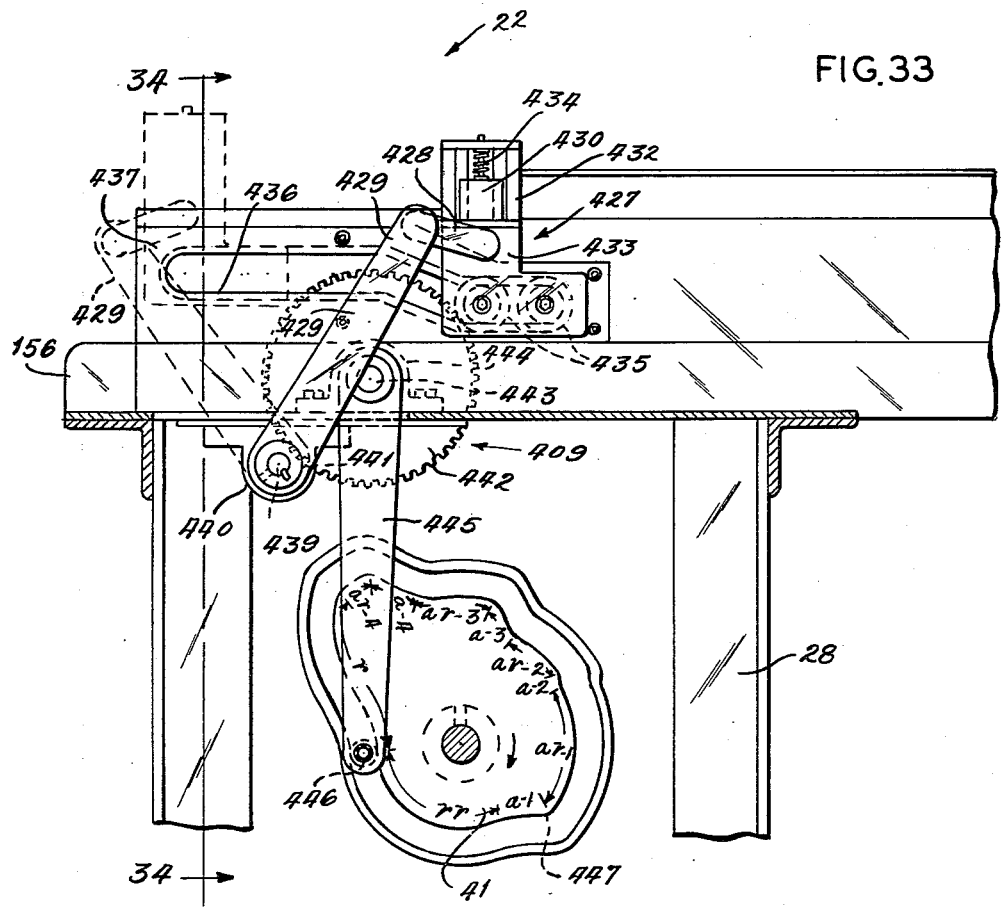
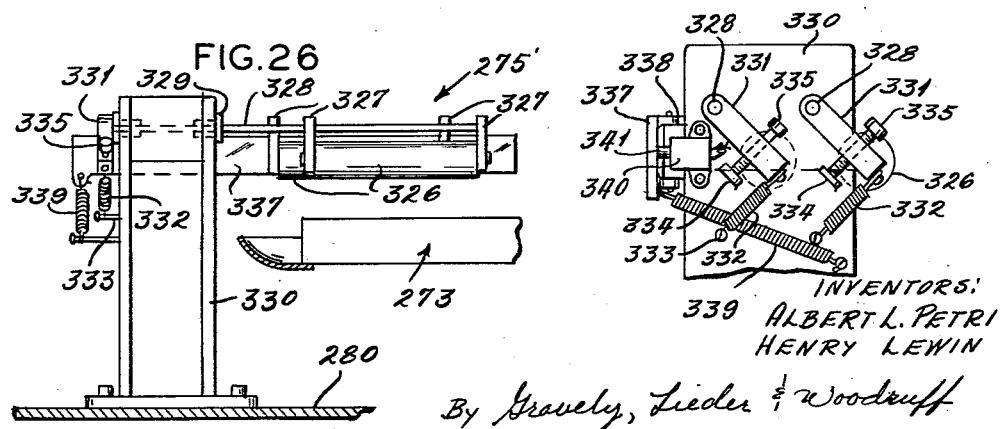

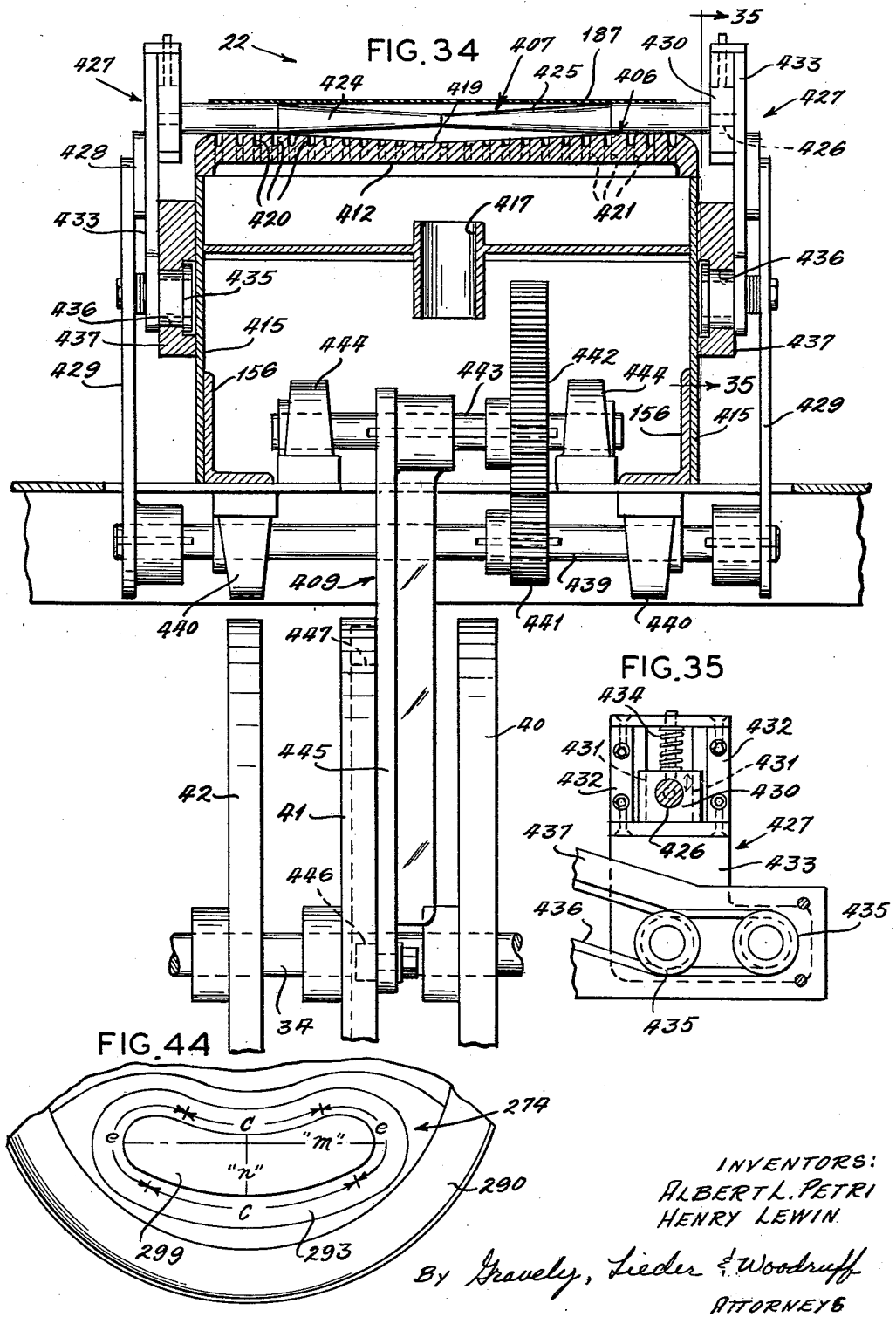

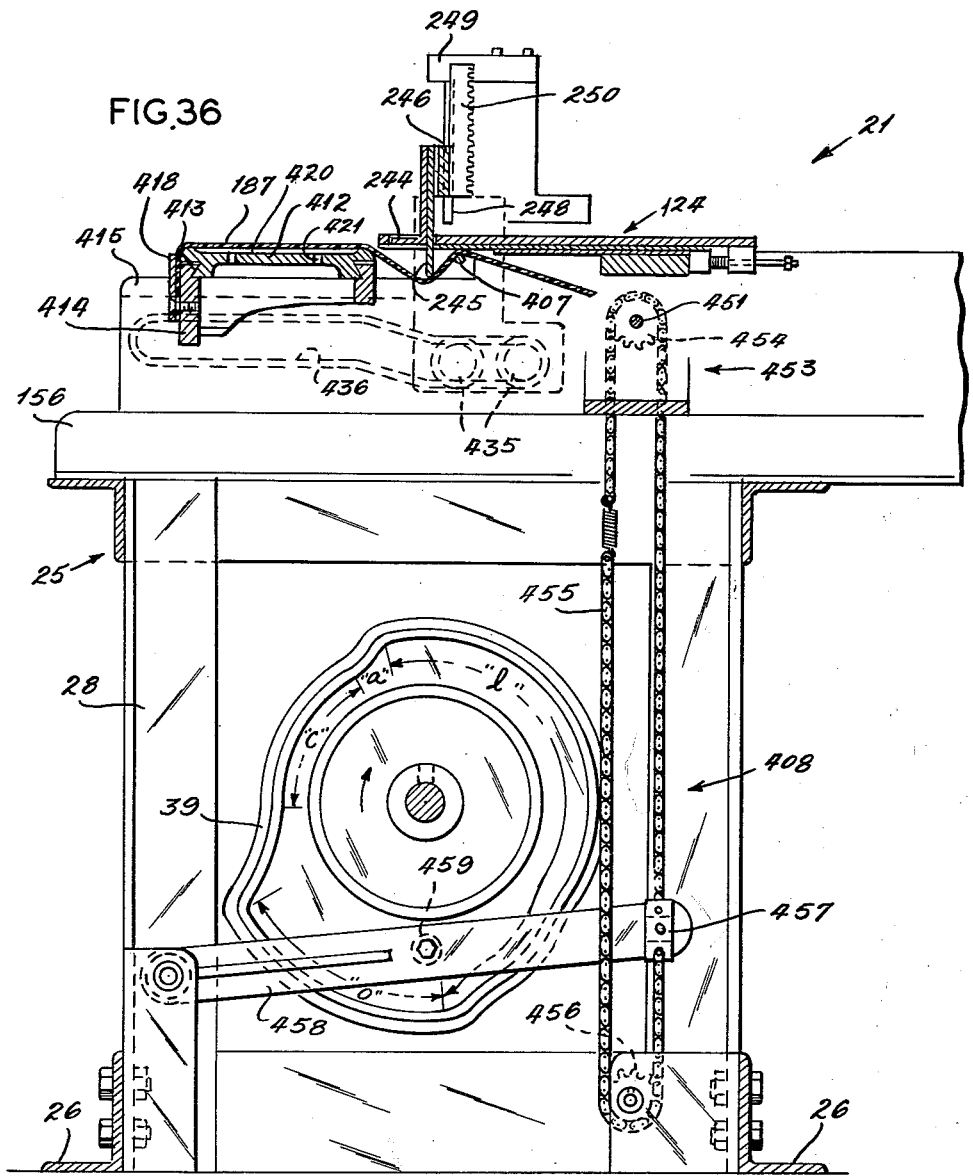

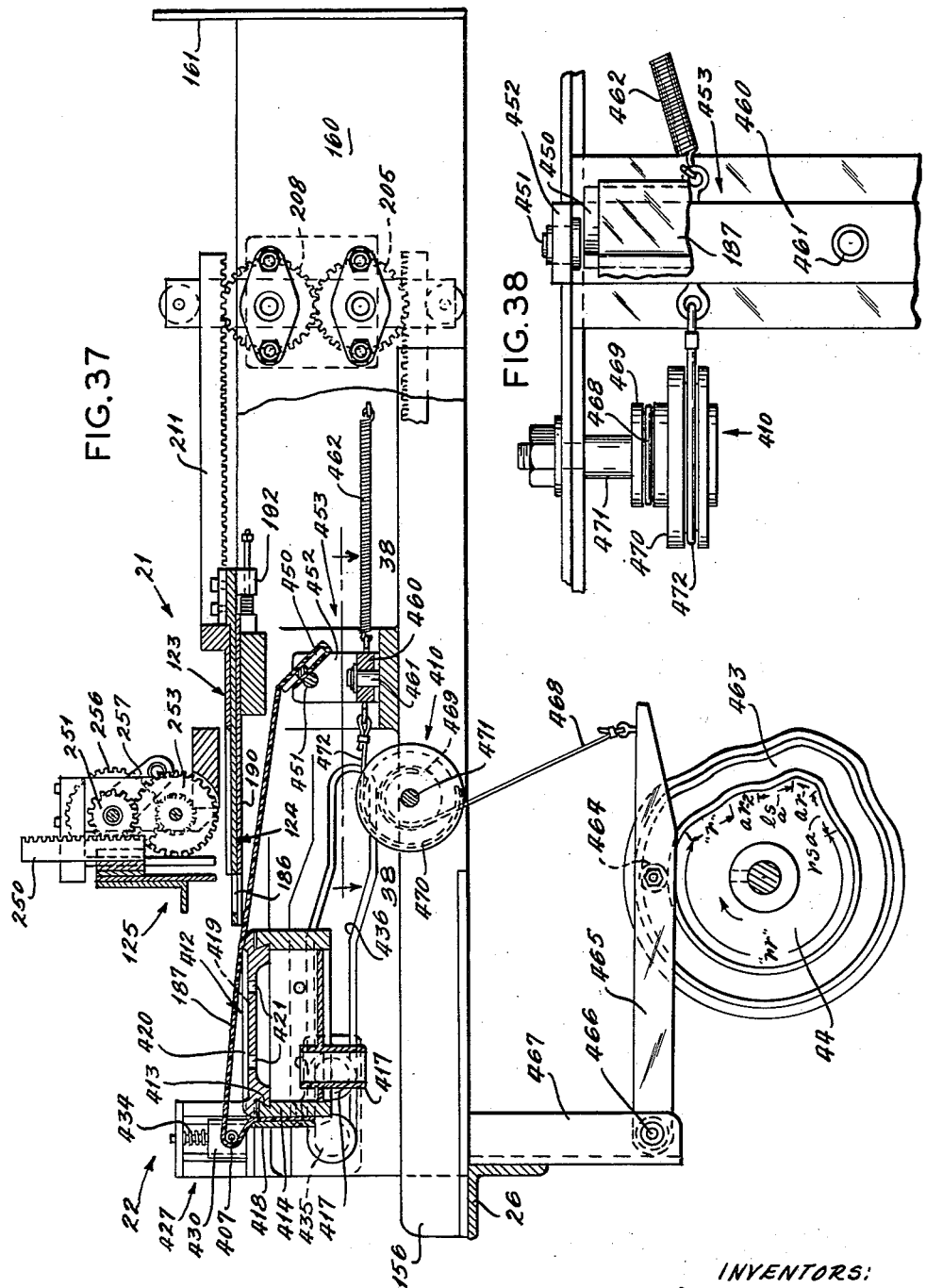

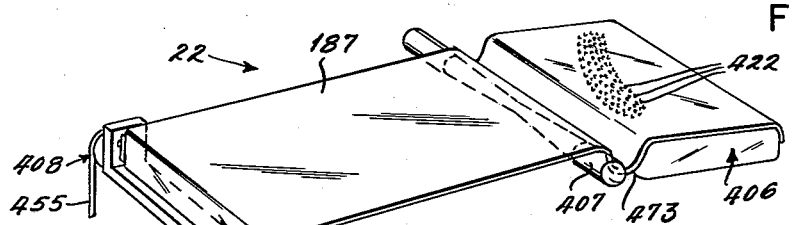
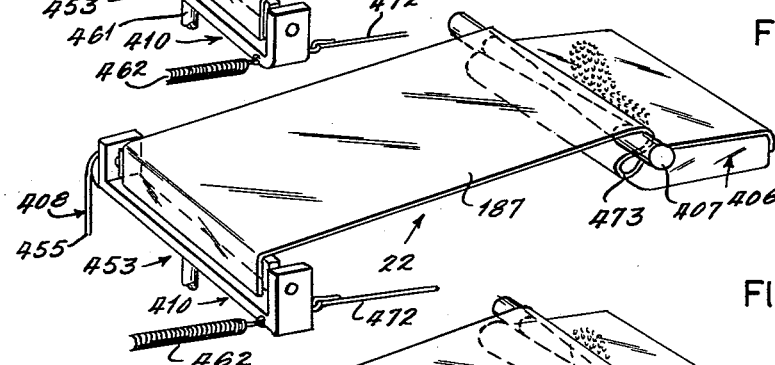
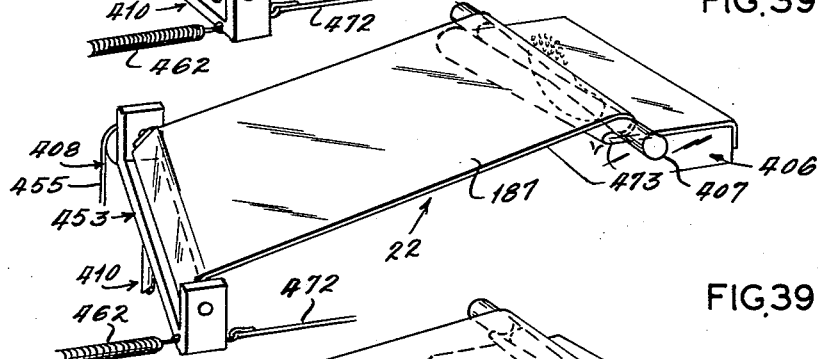
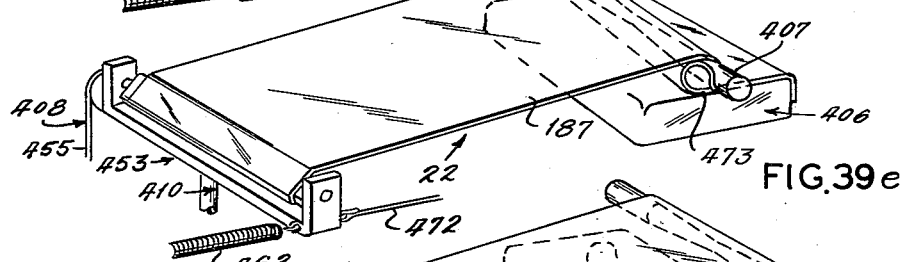
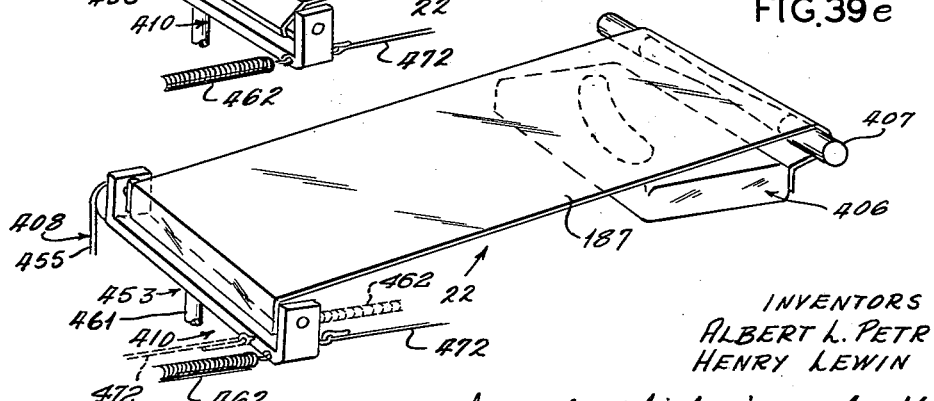

United States Patent Office 3,105,497
Patented Oct. 1, 1963

3,105,497
CIGAR MAKING MACHINE
Albert L. Petri, Atherton, Calif., and Henry Lewin,
Clarksville, Tenn., assignors, by mesne assignments, to
Petri Cigar Company, Clarksville, Tenn., a corporation
of Tennessee
Filed Mar. 13, 1959, Ser. No. 799,137
9 Claims. (Cl. 131—35)

This invention relates generally to cigar making machines, and more particularly to improvements in automatic mechanisms for manufacturing uniform cigars.

Heretofore many mechanisms and devices have been proposed for mechanically producing cigars having a uniform length and desired shape, using filler, binder and wrapper and applying adhesive on an end portion of the binder and wrapper. However, none of these devices has been entirely satisfactory, particularly for making cheroot or "stogie" type cigars. Although the present cigar making machine is adapted to form various shaped cigars, it will be described hereinafter for purposes of disclosure with reference to the manufacture of stogie cigars as well as cylindrical cigars of indeterminate length to be cut into shorter cigars.

The typical stogie cigar has a substantially frusto-conical shape, and two of these cigars are produced by rolling a single cigar having an enlarged central portion and long tapering ends, clipping the ends and then cutting the cigar through the center. In hand-rolled stogie cigars, a bunch or filler is formed of long strands of tobacco and the bunch is then wrapped with a wrapper of fine grade tobacco, the wrapper being provided with suitable paste or adhesive on one or both sides or along the edges thereof, the wrapper going twice around the filler to eliminate the necessity for a conventional binder. Several wrappers are generally cut from a single leaf of tobacco, but, because of the vein structure, they are formed from either the left or right-hand half of the leaf using oppositely shaped dies. A cigar having a left-hand leaf portion must be rolled starting from the opposite end as a cigar having a right-hand leaf portion, inasmuch as the veins on left and right-hand wrappers extend in opposite directions. Furthermore, hand-rolled cigars are formed of tobacco having a residual or natural moisture content of substantially 40% to 45%. Inasmuch as the aroma and taste of a cigar is adversely affected by decreases in the moisture content, which cannot be artificially corrected after the cigar is made, it is important that a cigar making machine be adapted to handle such moist tobacco for long periods of time without becoming gummed up and inoperative and without compressing the tobacco forming the filler into a solid mass or plug. Heretofore, mechanisms proposed for rolling cigars have not been able to meet the requirement of using tobacco with a moisture content up to 45%.

Cigar machines heretofore have also had the disadvantages of requiring straightening and other pre-treatment of tobacco after fermentation and prior to machine rolling, of being unable to rapidly produce uniform cigars using fillers or bunches formed of different lengths of tobacco, of requiring a great deal of personnel in the operation, inspection and maintenance thereof, and of being expensive to manufacture and maintain and relatively large and heavy.

The principal object of the present invention is to provide an improved cigar making machine which overcomes the disadvantages known heretofore and is adapted to rapidly manufacture uniform cigars having a high moisture content.

Another object is to provide a cigar making machine adapted to form uniform cigars of different lengths and which is adapted to operate efficiently for long periods of time with tobacco having a high moisture content without requiring down time for cleaning, repair or the like.

Another object is to provide a cigar making machine which is compact, requires little floor space, is easily operated and is economically manufactured and maintained.

Another object is to provide a cigar making machine, the operation of the several mechanisms thereof being in timed relationship and indexed in operation so that the machine may operate at variable speeds and produce uniform cigars at all production speeds.

Still another object is to provide a machine having a universal wrapper pattern so that wrappers may be cut from either left or right-hand halves of tobacco leaves without changing dies, and which will manufacture cigars using either "left-hand" or "right-hand" wrappers.

A still further object is to provide improved mechanisms for forming and transferring bunches or fillers, for forming and transferring wrappers, and for pasting and rolling cigars.

Another object is to provide a machine that eliminates the need for a binder, and which is adapted to form bunches of long filler tobacco material by rolling the wrapper around the bunch in a laminated condition and by properly applying adhesive.

A still further object is to provide an improved mechanism for manufacturing variously shaped cigars including a cylindrical cigar which may be cut into several shorter cigars.

These and still other objects and advantages will become apparent hereinafter.

Briefly, the present cigar making machine comprises integrated mechanisms cross feeding filler tobacco into a bunch-forming mechanism which forms a bunch therefrom and delivers it to the rolling station, and means for forming wrappers and delivering a wrapper to an indexed position on the rolling table, means controlling the quantity and pattern of paste deposited on the wrapper and means rolling the bunch in the wrapper in a predetermined shape to produce a cigar. The invention also relates to improvements in individual apparatus, mechanisms and devices integrated into the machine and control means therefor. The invention further consists in parts and in the arrangements and combinations of parts hereinafter described and claimed.

Figure 8:
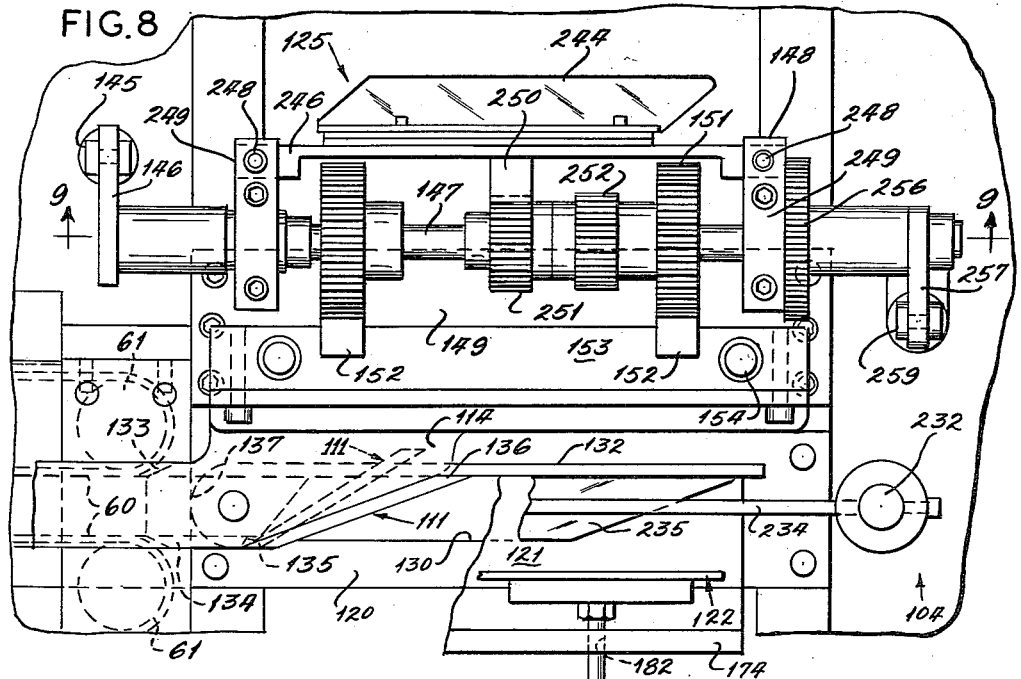
Figure 9:
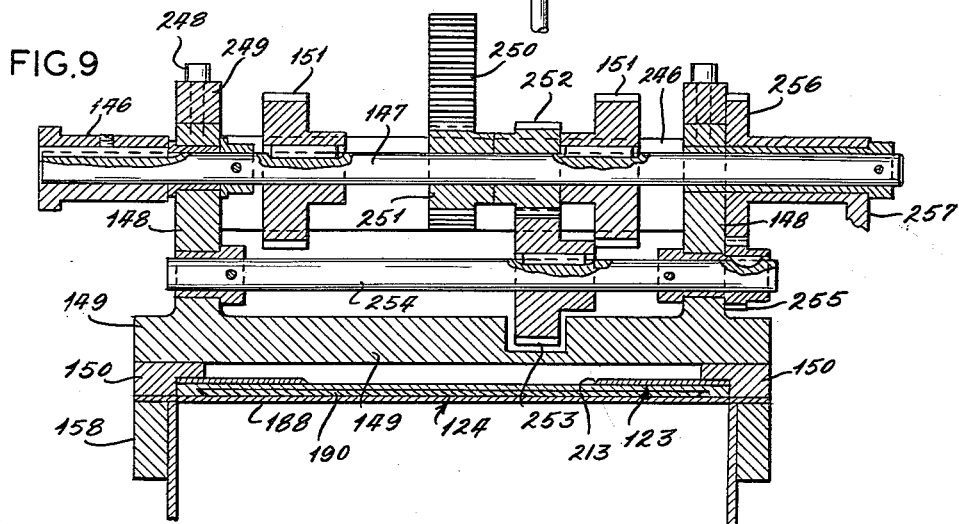
Figure 43:
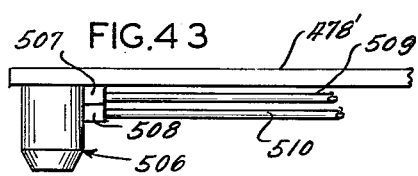

In the accompanying drawings which form a part of this specification and in which like numerals refer to like parts wherever they occur:

FIG. 1 is a top plan view of a cigar making machine embodying the present invention, FIG. 2 is a vertical elevational view, partly in section, showing the principal drive means for the machine, FIG. 3 is a vertical cross-sectional view of the cross feed mechanism taken substantially along line 3—3 of FIG. 2, FIG. 4 is a vertical cross-sectional view showing a portion of the drive means for the cross feed mechanism and also showing the vertical cut-off knife cam and mechanism, FIG. 4 being taken along line 4—4 of FIG. 2, FIG. 5 is another cross-sectional view of the cross feed mechanism vertical knife and vertical compactor as taken along line 5—5 of FIG. 1, FIG. 6 is a plan view of a portion of the drive means for the cross-feed mechanism and switch means in the machine, FIG. 7 is is a schematic view of the electrical control means for the cross feed mechanism, FIG. 8 is a plan view of the vertical knife, compactor and knock-out devices, FIG. 9 is a vertical cross-sectional view taken along line 9—9 of FIG. 8, FIG. 10 is a plan view, partly in section, of the cross feed, bunch forming and rolling table mechanisms, FIG. 11 is a vertical cross-sectional view of the slide plate and alignment block and cam therefor as taken along line 11—11 of FIG. 2, FIG. 12 is a vertical cross-sectional view of the reservoir for the bunch forming mechanism taken along line 12—12 of FIG. 5, FIG. 13 is a vertical cross-sectional view of the transfer box and cam therefor as taken along line 13—13 of FIG. 2, FIG. 14 is a vertical cross-sectional view of the horizontal knife and cam therefor as taken along line 14—14 of FIG. 2, FIG. 15 is a view taken along line 15—15 of FIG. 10 showing a portion of the transfer box and horizontal knife control means, FIG. 16 is a vertical cross-sectional view showing the vertical compactor and the adhesive means and cams therefor and also showing the knock-out device and rolling table mechanism, FIG. 17 is a view of the compactor cam per se, FIG. 18 is a vertical view of the control means including the cam for the knock-out device shown in FIG. 8, taken along line 18—18 of FIG. 2, FIG. 19 is a plan view of the wrapper forming and rolling table mechanisms showing the left-hand and right-hand wrapper leaf transfer from the former to the latter, FIG. 20 is a vertical cross-sectional view of the rotary table and dies as taken along line 20—20 of FIG. 1, FIG. 21 is a vertical elevational view of the drive mechanism for the rotary table taken along line 21—21 of FIG. 2, FIG. 22 is a plan view of roller assemblies for supporting the rotary table, FIG. 23 is a greatly enlarged vertical elevational view of cut-off roller means for cooperation with the rotary table dies, as taken along line 23—23 of FIG. 19, FIG. 24 is a cross-sectional view taken along line 24—24 of FIG. 23, FIG. 25 is a plan view of another improved cut-off roller means for the rotary table dies, FIG. 26 is an elevational view of the improved roller means taken along line 26—26 of FIG. 25, FIG. 27 is an end view of the improved roller means taken along line 27—27 of FIG. 25, FIG. 28 is a fragmentary vertical elevational view of the drive means for the rotary table shown in FIG. 21, FIG. 29 is a fragmentary sectional view taken along line 29—29 of FIG. 28, FIG. 30 is a sectional view taken along line 30—30 of FIG. 28, FIG. 31 is a vertical cross-sectional view of the wrapper transfer means and cams therefor as taken along line 31—31 of FIG. 2, FIG. 32 is a cross-sectional view of the pick-up head per se, FIG. 33 is a side elevational view of the rolling table mechanism and the cam for the forming roller as taken along line 33—33 of FIG. 2, FIG. 34 is an elevational view taken along line 34—34 of FIG. 33 and showing the forming roller in the phantom line position thereof, FIG. 35 is a greatly enlarged view showing the carriage assembly for the forming roller as taken along line 35—35 of FIG. 34, FIG. 36 is a vertical elevational view, partly in section, of the apron tightening means and cam therefor as taken along line 36—36 of FIG. 2, FIG. 37 is a vertical cross-sectional view of the rolling table and bunch forming mechanisms and the cam for the apron control means as taken along line 37—37 of FIG. 2, FIG. 38 is a fragmentary cross-sectional view taken along line 38—38 of FIG. 37, FIGS. 39a–e are diagrammatic perspective views showing a series of steps in the rolling operation of the rolling table mechanism, FIG. 40 is a view of the double cam for the adhesive means, FIG. 41 is a fragmentary elevational view of the guide member for the adhesive means, FIG. 42 is a cross-sectional view of the double cam and guide member for the adhesive means, FIG. 43 is a view of a modified adhesive control arm, FIG. 44 is a fragmentary plan view of a die of the rotary table mechanism showing the universal wrapper leaf pattern, and FIG. 45 is an exploded perspective view showing a typical stogie cigar formed in the present machine with the end portions clipped and being severed in the center to form two cigars.

As shown in FIG. 45, a typical stogie cigar C formed by the present machine is shown for purposes of illustration, but the machine is also adapted to form cigars of other shapes. The cigar C has a central filler $f$ rolled in a wrapper $w$ and the cigar has end portions $e$ trimmed therefrom when the cigar is taken from the present machine by suitable mechanism. The cigar C is also divided at its center to form two frusto-conical cigars from the single cigar made by the machine.

Referring now to the other drawings in detail, it will be seen that the present cigar making machine comprises a cross feed mechanism 20, a bunch forming and transfer mechanism 21, a rolling table mechanism 22, a wrapper forming and transfer mechanism 23 and an adhesive depositing mechanism 24. These mechanisms and the drive and control means therefor are supported on a main frame 25 having longitudinal upper and lower members 26, cross members 27 and vertical members 28. As shown in FIG. 1, the cross feed mechanism 20 is mounted on the left-hand portion of the frame 25, the wrapper forming and transfer mechanism 23 is mounted on the right-hand portion thereof, the bunch forming and transfer mechanism 21 and the rolling table mechanism 22 are mounted on the central portion of the frame 25 in transverse alignment, and the adhesive depositing mechanism 24 is also supported on the central portion of the frame.

Referring to FIG. 2, the machine is powered from a variable speed motor 30 or the like mounted on the main frame 25 and being horizontally adjustable by means 31 for regulating the tension of drive belt 32 which extends around wheel 33 for driving a main shaft 34 through a suitable reducer unit 35 and an overload clutch 36. The main shaft 34 is journaled in bearings in the main frame 25 and carries a plurality of cams 38–49 and sprocket wheel 50, a single revolution of the main shaft 34 effecting a complete cycle of the operation of the machine to produce one cigar. As will be described more fully hereinafter, the cams 38–49 comprise a portion of the drive and control means for the machine and include a vertical knife cam 38, an apron tightening cam 39, a horizontal knife cam 40, a forming roller cam 41, a transfer box cam 42, a slide plate and alignment block cam 43, a swivel bar control cam 44, a compactor cam 45, an adhesive control cam 46, a pick-up head height control cam 47, a knock-out device cam 48 and a pick-up head rotating cam 49.

*Cross feed mechanism.*—The cross feed mechanism 20, FIGS. 1–7, is mounted on a top plate 53 having side and cross members 54 and 55 secured to the underside thereof and spaced above the main frame 25 by vertical members 56. Longitudinal angle members 57 are secured to the plate 53 to form a longitudinal channel 58 in which a horizontal feed belt 59 and spaced vertical feed belts 60 move to define a feed conveyor for carrying a layer of tobacco strips (not shown) to the bunch forming mechanism 21. The forward end of the side belts 60 are mounted on drive pulleys or rollers 61 and the rearward ends extend around idler pulleys or rollers 62. Suitable adjustment means 63 may provide for belt tension adjustment. Cover plates 64 are also provided to cover the top and return side of the belts 60 and to form a flange 65 extending over the upper margin of the delivery portion of the side belts 60. The horizontal or bottom belt 59 has side margins which are positioned under the lower margins of the side belts 60, and the rearward end of the belt 59 extends around an idler roller 66 that can be adjusted longitudinally relative to the top plate 53 to provide for proper belt tension. Mounted on a stub shaft 67 in juxtaposition with the drive rollers 61 is a drive roller 68 for the belt 59. The forward end of the belt extends around an idler roller 69 forwardly of the drive roller 68, and another idler roller 70 is journaled in the frame in position to form a reverse curvature in the belt 59 as it extends around rollers 69 and 70 and drive roller 68. A friction or pressure roller 71 is also mounted adjacent to the periphery of the drive roller 68 so that the belt is firmly held thereagainst to be driven when the roller 68 and shaft 67 are rotated.

The stub shaft 67 carries bevel gears 73 adjacent to the drive roller 68 and each of the drive rollers 61 for the side belts 60 is driven by a bevel gear 74 meshed with one of the bevel gears 73. Mounted on one end of the shaft 67 is a sprocket wheel 75, which is driven by a sprocket chain 76 extending around sprocket 77 on one end of a shaft 78 journaled in bearings 79 secured to the main frame 25. Another stub shaft 80 is journaled in bearings 81 on frame 25 and is axially aligned with shaft 78 and the adjacent ends of these shafts are provided with a suitable magnetic clutch 82 which, when engaged, drives the belts 59 and 60 through the drive means just described. The other end of the shaft 80 is provided with a bevel gear 83 meshed with a gear 84 secured to a longitudinally extending shaft 85 journaled in bearings 86 mounted on frame 25. The shaft 85 has a sprocket wheel 87 driven through a chain 88 from the sprocket wheel 50 on the main drive shaft 34. The stub shaft 85 for transmitting power to the clutch 82 is turned with the main shaft 34 in a 1:1 ratio, and the clutch shaft 80 is preferably in a 2:1 ratio with the shaft 85.

The stub shaft 85 also carries a plurality of cams 90, 91 and 92 for engagement with micro-switches 93, 94 and 95, respectively. The length of the cam surfaces is varied to cause the micro-switches to be closed for different time intervals. The micro-switches 93, 94 and 95 are selectively placed in the electrical circuit 96, FIG. 7, by switch 97 for energizing solenoid 98 of the magnetic clutch 82 whereby the time interval each micro-switch is closed is translated into lineal actuation of the filler tobacco by movement of the feed conveyor 58. A relay coil 100, has normally closed contacts 101 in series with the selector switch 97 and the clutch solenoid 98, and the relay coil is associated with normally open and normally closed limit switches 102 and 103 so that the cross feed mechanism 20 operates only when additional tobacco is required by the bunch forming mechanism 21. A compactor device 104 of the mechanism 21 serves to press tobacco prior to the portion of the machine operation in which the cross feed mechanism is actuated. The normally open switch 102 is an upper limit switch, which is closed by a cam 105 on the compactor device 104 during initial movement thereof toward tobacco pressing position, to energize the relay coil 100 and to open contacts 101 while establishing a hold circuit for the relay coil through normally open contacts 106. Therefore, when the upper switch 102 has been closed by the compactor 104, the relay contacts 101 are open to break the circuit to the clutch solenoid 98 until the relay coil 100 is deenergized.

The normally closed switch 103 is a lower limit switch opened by a cam 107 on the compactor device 104 to break the circuit to relay coil 100 when the amount of tobacco in the bunch forming mechanism 21 is below a predetermined level. Accordingly, the contacts 101 will be closed by the de-energization of relay coil 100 so that on the next revolution of the stub shaft 85 one of micro-switches 93, 94 or 95 is closed by the cam therefor and the cross feed mechanism 20 will be operative. As indicated, by moving the selector switch 97 to a different micro-switch, the time interval of cross feed actuation can be controlled to provide longer or shorter lengths of filler material so that different length cigars may be made.

The cross feed mechanism 20 includes a shelf 109 on which strips of filler tobacco are placed and from which these strips may be laid in the feed conveyor channel 58 by an operator to form a layer of tobacco which is fed intermittently forwardly by the engagement of the clutch 82 to deliver a predetermined length of filler material to the bunch forming mechanism 21.

The cross feed mechanism 20 also includes a vertically reciprocable pressure member 110, which is associated with a vertical cutter knife 111 of the bunch forming mechanism 21 and is actuated simultaneously therewith by the cam 38. As shown best in FIG. 5, the pressure member 110 comprises a shoe 112 carried on rods 113 extending through openings in a horizontal carrier member 114, and springs 115 are positioned around the rods 113 between the shoe 112 and member 114 to bias the former downwardly. The shoe 112 has an upwardly turned rearward lip 116 to facilitate the feeding of tobacco beneath the shoe. A roller 117 carried on arm 118 pivotally mounted on the frame is positioned in the cross feed channel rearwardly of the pressure member, FIGS. 1 and 2. The roller 117 rides on the tobacco in the channel and presses the tobacco and assists in directing it under the shoe 112.

In operation, the pressure member 110 and the knife 111 are in raised position during cross feed actuation by the cam 38, as will be described more fully in connection with the knife device. When the cross feed mechanism is again at rest by the de-energization of clutch solenoid 82, the cam 38 moves the shoe 112 into tobacco pressing contact in the cross feed channel 58 and also moves the knife 111 into tobacco severing position. However, the shoe contacts the tobacco before the knife comes into contact therewith and continued downward movement of carrier member 114 causes springs 115 to exert additional pressure on the tobacco to hold it in fixed position during the cutting operation.

*Bunch forming and transfer mechanism.*—The bunch forming mechanism 21 is positioned to the right of the cross feed mechanism 20 in FIGS. 1 and 2 of the drawings and receives tobacco therefrom as required. The bunch forming mechanism comprises the vertical knife 111, a reservoir block 120, the vertical compactor 104, a slide plate 121, an alignment block 122, a horizontal knife 123, a transfer block 124 and a knock-out device 125.

Referring to FIGS. 4, 5 and 8, the knife 111 has a lower cutting edge 127 and is movable vertically into cutting relationship with an undercut forward edge 128 of a fixed lower knife member 129. The cutting edges 127 and 128 of the knife members are in a predetermined angular position relative to the longitudinal direction of movement of the layer of tobacco in the cross feed channel. Accordingly, the end edges of the tobacco layer cut by the knives are angular to form a parallelogram-shaped length of tobacco substantially complementary to the shape of the reservoir opening 130 in the reservoir block 120, FIG. 10.

The bottom belt 59 of the cross feed extends forwardly of the side belts 60 and around idler roller 69 which is journaled in the frame below the lower knife member 129. The rearward margin 131 of the knife 129 is undercut on a radius from the axis of roller 69 and is spaced approximately the thickness of belt 59 from the periphery of the roller 59. The level of the upper surface of knife 129 is below the horizontal plane of the belt 59 so that tobacco from the belt 59 will slide smoothly across the knife 129. An abutment and guide plate 132 is secured to the reservoir block 120 in substantially conterminous relation with the side belt 60 and in vertical alignment with the forward wall of opening 130, the rearward margin 133 being cut angularly to fit immediately adjacent to the drive roller 61 to receive the belt 60 therebetween, FIGS. 8 and 10. Another guide plate 134 is spaced from plate 132 to define an extension of the feed channel, the longitudinally forward end 135 of the plate 134 being behind the position of vertical knife 111. The knife 111 has a side margin 136 in surface contact with the abutment plate 132.

The knife 111 is secured to a block 137 pivotally mounted on carrier member 114 to adjust the knife to different angular positions (as shown in broken lines in FIG. 8) and the lower knife member 129 is one of a set of removable blades having different angular edges complementary to predetermined positions of the knife 111 so that the shape of the tobacco cut may be varied when making other cigars. The control means for actuating the knife 111 and pressure member 110 in the cross feed channel 58 will now be described.

The cam 38 has a closed path surface 139 and a lever 140 has one end 141 pivoted to a frame member 26 and the other end carries a cam follower 142, FIGS. 4, 5, 8 and 9. A vertical rod 143 is pivoted at its lower end 144 to lever 140 and its upper end 145 is pivotally connected to one end of a link 146, which is secured on one end of a shaft 147 journaled in spaced upstanding bearing blocks 148 of a base member 149 rigidly secured to a bunch forming mechanism frame 150 supported on the main frame 25. The shaft 147 has spaced spur gears 151 thereon, which are meshed with toothed vertical racks 152 secured to a guide member 153 vertically slidable on spaced vertical rods 154 secured to the base member 149. The carrier member 114 for the knife 111 and pressure member 110 is rigidly secured to the guide member 153.

The cam 38 is shown in FIG. 4 starting a rest period in which the guide member 153 is elevated to hold the pressure member 110 and knife in retracted position. The retracted rest portion of cam surface 139 is designated "rr" and is set out by arrows. The actuation portion of cam surface 139 is designated "a," and the retraction portion is designated "r." The cam 38 also has an actuated rest portion shown as "ar." For purposes of disclosure, all cams will be similarly designated.

When the cam follower 142 moves through the actuation portion "a" of cam 38, the lever 140 is moved upwardly to rotate shaft 147 clockwise in FIG. 4, whereby racks 152 will be actuated downwardly by spur wheels 151 to move the pressure member 110 into tobacco pressing position and to carry the knife 111 into shearing or cutting position with the knife element 129. The cam 38 holds the pressure member and knife in actuated position for rest period "ar" and then retracts them to elevated position. The tobacco thus cut from the cross feed supply is in position over the reservoir opening 130.

Referring now to FIGS. 1, 10, 11, 13, 14 and 16, it will be seen that frame members 156 extend transversely of the main frame 25 and rearwardly therefrom to form a support for a cantilever housing 157 in which control means for the bunch forming mechanism 21 is housed. The housing 157 also includes upper horizontal frame members 158, vertical members 159, and side and end plates 160 and 161.

The reservoir block 120 is mounted above the housing 157 and forwardly thereof over the main frame 25. The slide plate 121 is slidably positioned on top of the reservoir block 120 and the alignment block 122 slides on the slide plate 121. The slide plate 121 is movable between an actuated position in which the reservoir opening 130 is uncovered to receive bunch lengths of tobacco from the cross feed mechanism 20 and a retracted position in which the plate 121 abuts the abutment and guide plate 132 to cover the opening 130 so that the slide plate 121 supports tobacco thereon when the cross feed mechanism is actuated and while it is being cut by the vertical knife 111. The alignment block 122 cooperates with the slide plate 121 and moves opposite thereto between an actuated position and a retracted position. In actuated position, tobacco on the slide plate is pushed against the alignment plate 132 in vertical alignment with the reservoir opening 130 as the slide plate is actuated to a withdrawn position so that the filler tobacco will be discharged into the opening 130 and form a vertical stack therein. In retracted position, the alignment block 122 moves away from the plate 132 as slide plate moves to retracted or closed position over the reservoir opening 130 so that the cross feed tobacco will pass between the plate 132 and block 122.

The slide plate and alignment block 121 and 122 are controlled by the cam 43, FIG. 11, having a closed cam surface 162 in which follower 163 is positioned. The follower 163 is mounted intermediate the ends of a lever 164, the lower end 165 of which is pivoted to frame cross member 27 and the upper end 166 being pivoted to one end of a drive rod 167. The other end 168 of the rod 167 is pivotally connected to the lower end of link 169, which is secured intermediate its ends to cross shaft 170 journaled in end bearing members 171 mounted on side plates 160 of the housing 157. The upper end 172 of link 169 is connected to rod 173 and the other end of the rod 173 is secured to a connecting element 174 secured to the rearward edge of the slide plate 121.

The shaft 170 also has a spur gear 176 thereon which is meshed with a spur gear 177 on a shaft 178 journaled in the end bearing members 171. One end of a link 179 is secured to the shaft 178 and the upper end 180 of the link 179 is pivoted to a rod 181. The rod 181 extends through an opening or notch 182 in connecting element 174 and has its end secured to a back plate 183 on alignment block 122, FIG. 12.

The cam 43 is shown in FIG. 11 beginning the rest portion of its cycle in which the slide plate 121 and alignment block 122 are in retracted positions. In the actuation portion "a," cam 43 withdraws slide plate 121 from over the reservoir opening 130 by moving the drive rod 167 to the left and rotating the shaft 170 and gear 176 clockwise. The shaft 178 is thus rotated counterclockwise by gear 177 to pivot link 179 to the left and actuate the alignment block 122 toward plate 132. In the retract portion "r" of the cam 43, the reverse action takes place. Inasmuch as the rod 181 extends through the opening 182 in element 174, the rods 173 and 180 are kept parallel for rectilinear movement of the slide plate 121 and alignment block 122.

The transfer box 124 and the horizontal knife 123 are positioned beneath the reservoir block 120 and are movable transversely relative to the main frame 25. The transfer box 124 is spaced below the reservoir block and has an opening 186 similar to the reservoir opening 130, these openings being aligned when the box 124 is retracted. The box is adapted to be actuated to a forward position toward the rolling table mechanism 22 to deposit a tobacco bunch for one cigar on a flexible apron 187 forming a portion of the rolling table mechanism. The transfer box 124 is formed of an elongated plate of predetermined thickness and slides on an imperforate plate 188 of bearing material secured to the frame members 158. The lower surface of the box 124 is relieved to form an open ended channel 189 in which a bottom cover 190 is positioned, FIGS. 11-14. Spaced blocks 191 are secured to the bottom of the cover 190 at the rearward end thereof, and rods 192 extend rearwardly from the blocks 191 through openings 193 in blocks 194 secured below the end of the transfer box 124. Springs 195 on the rods normally bias the cover 190 forwardly to a closed position relative to the transfer box opening 186. A stop member 196 is secured between the frame members 158 in position to be contacted by the cover blocks 191 near the bunch discharge position of the transfer box 124 during the actuation thereof so that the forward movement of the cover 190 will be stopped to open the bottom of the transfer box.

The cam 42 for controlling the movement of the transfer box 124 has a cam surface 198 in which is positioned a follower 199 connected intermediate the ends of lever 200, the lower end 201 of the lever being pivoted to frame member 27 and the upper end 202 being pivotally connected to rod 203, FIGS. 13 and 15. A toothed rack 204 has one end connected to the rod 203 and the rack is meshed with a spur gear 205 which is positioned intermediate the ends of a shaft 206 and is rotatable relative to the shaft. An idler roller 207 is positioned below the gear 205 to support the rack 204 and maintain it in engagement with gear 205. Another spur gear 208 is freely rotatable on a shaft 209 and is meshed with gear 205, and another guide or idler roller 210 is spaced above gear 208 to maintain another toothed rack 211 in mesh with the gear 208. The rack 211 is secured to the center of the rear margin of the transfer box 124 and it is apparent that the transfer box is driven by cam 42 through lever 200, rack 204, gears 205 and 208 and rack 211.

The actuation portion "a" of cam 42 is substantially completed in FIG. 13 and the cam is moving into the actuated rest portion "ar" in which the transfer box 124 is forward in bunch discharging position. When the follower 199 moves along the retract portion "r" of cam 42, lever 200 and rack 204 will move to the right to rotate gear 205 counterclockwise and gear 208 clockwise thereby moving rack 211 to the right also.

The horizontal knife 123 is positioned between the reservoir block 120 and the transfer box 124 and is slidable on each, the knife 123 having a retracted position in which the transfer box 124 is retracted and the opening 186 thereof forms a portion of the reservoir opening 130. The horizontal knife is movable to an actuated forward position in which the tobacco in the vertical stack is severed across the top of the box 124 to form a bunch for making one cigar. It is apparent that the transfer box remains in retracted position until the knife 123 is fully actuated, and the box is then actuated to bunch discharging position and again fully retracted to reservoir position before the knife is retracted. Accordingly, the knife forms a bottom for the reservoir opening 130 during transfer box actuation and retraction to maintain the vertical stack of tobacco thereabove.

The horizontal knife 123 has a V-shaped cutting margin 213 to facilitate the clean cutting of tobacco, which is an important feature of the operation of any cigar machine, FIG. 10. As shown in FIG. 12, the bottom portion 214 of the reservoir block 120 is formed of hardened material and the forward lower portion of the block in front of the opening 130 therein is cut away as at 215 to reduce the area against which the knife 123 must slide whereby the tendency for tobacco stain or gum to adhere to the knife and be transferred to the reservoir block will be minimized. In the treatment of extremely moist tobacco, the tendency for the blade or knife 123 to gum up and also gum the reservoir block is accentuated. However, it has been discovered that by spraying a fine mist of water on the knife each time it is retracted no gumming will occur. Accordingly, a spray nozzle 216, FIG. 1, is connected to a supply of water (not shown) and positioned to eject a spray on the knife particularly in the corner of the V or at the conjunction of the sides of the edge 213. The water valve for the nozzle 216 may be opened by any suitable means, such as a cam actuated micro-switch 217 on shaft 85, FIG. 6.

The control means for the horizontal knife 123 is similar to the means for actuating the transfer box 124, FIGS. 14 and 15. The cam 40 has a cam surface 219 on which is positioned a follower 220 mounted intermediate the ends of a lever 221, the lower end 222 being pivoted on cross frame member 27 and the upper end 223 being pivoted to a rod 224. A toothed rack 225 has one end secured to the rod 224 and the rack 225 is supported on a guide roller 226 in mesh with a spur gear 227 secured to one end of the shaft 206. A similar gear 227' is also secured on the other end of shaft 206 to be turned by it. Upper gears 228 and 228' are keyed to the shaft 209 and are meshed with gears 227 and 227' and with racks 229 which are connected to the rear portion of the knife 123 adjacent to the sides thereof. The racks 229 are kept in engagement with gears 228 and 228' by guide rollers 230.

In FIG. 14, the cam 40 is shown in its actuated rest portion "ar" in which the knife 123 is under the reservoir opening 130. However, the transfer box 124 is shown in retracted position as at the end of a cycle just prior to the retraction of the knife.

Referring now to FIGS. 5, 8, 16 and 17, the vertical compactor device 104 will now be described in detail. The compactor device 104 comprises a vertical rod 232 slidably mounted in a keyed guide sleeve 233 and having a laterally extending arm 234 adjustably secured adjacent to its upper end. A plate 235 having a shape substantially complementary to the shape of reservoir opening 130 is secured to the arm 234 in vertical alignment with the opening. The lower end 236 of the compactor rod 232 is positioned on a shoe 237 mounted on one end of a lever 238, which has its other end pivoted to a frame member 239. A follower 240 is mounted on the lever 238 intermediate its ends, and is positioned against the outer periphery of an open cam 45, FIGS. 16 and 17. The cam or switch contact member 107 connected to the compactor or plunger device 104 is just above follower 241 for the upper normally open switch 102 and is adapted to contact successively contact follower 241 to make switch 102 and a follower 242 for normally closed switch 103 when the amount of tobacco in the reservoir opening 130 is low so that the cross feed mechanism 20 will be actuated. The cam 45 has actuation and retraction portions "a" and "r," a short actuated rest portion "ar," and a long retraction rest portion "rr" (just beginning in the position shown in FIG. 16). The compactor 104 is actuated when the slide plate and alignment block 121 and 122 are actuated and before the horizontal knife 123 is actuated so that the vertical stack of tobacco will be pressed to a predetermined density while the horizontal knife is severing a bunch in the transfer box 124. The compactor 104 is then raised to complete its cycle.

The bunch forming mechanism 21 also includes the knock-out device 125 which is adapted to be actuated vertically downwardly through the opening 186 in the transfer box 124 to assure removal of all tobacco for one bunch therefrom. The knock-out device also forms a loop in the apron 187 to receive the bunch. As shown in FIGS. 8–11, 18 and 21, the knock-out device 125 comprises a parallelogram-shaped plate 244 substantially complementary to the opening 186 of the transfer box 124, and a loop forming vertical plate or finger 245 which extends below the plate 244. These plates 244 and 245 are secured to a rigid guide member 246 having vertical bores 247 in which rods 248 extend, the rods being secured at their upper ends to members 249 fixed to the tops of the bearing blocks 148 supporting the shaft 147 for the vertical knife gears 151. A vertical toothed rack 250 is secured to the center of the guide member, and the rack 250 is meshed with a spur gear 251 freely rotatable on the shaft 147. The spur gear 251 is secured to another gear 252 which rides freely on the shaft 147 and this gear is meshed with a gear 253 mounted on a lower shaft 254 journaled between the bearing blocks 148. A small gear 255 is mounted on the end of the shaft 254 and a larger gear 256 freely rotatable on the end of upper shaft 147 is meshed with gear 255, the large gear 256 having one end of a link 257 secured thereto.

The link 257 is pivoted, at 259, to the upper end of a connecting rod 260 (FIGS. 10 and 18), the lower end of which is pivotally connected to one end of a link 261 secured to a stub shaft 262 journaled in bearings 263. The other end of stub shaft 262 has a link 264 secured thereto and the upper end of a rod 265 is pivoted to the link 264 and to one end of a lever 266. The lever 266 has its other end 267 pivoted to the frame 25 and a cam follower 268 is carried on the lever 266 intermediate its ends. The follower 268 is positioned on cam surface 269 of the cam 48.

The knock-out cam 48 has actuation and retraction portions "a" and "r" and a retracted rest portion "rr," the cam being shown in FIG. 18 about to begin the actuation portion "a." It is apparent that the knock-out device 125 is reciprocated down and up in operation to perform the function of knocking tobacco from the transfer box 124 and simultaneously forming a loop in apron 187, FIG. 36. During actuation, link 257 turns shaft 258 counterclockwise to rotate the gear 256 and turn gear 255, shaft 254 and gear 253 clockwise so that gears 252 and 251 will turn counter thereto for moving the rack 259 downwardly. The retraction portion of the operation of the knock-out device 125 is the opposite.

*Wrapper forming and transfer mechanism.*—The wrapper forming mechanism 23 is positioned to the right of the bunch forming mechanism 21 and is adapted to form a wrapper from a tobacco leaf in which the bunch is rolled to form a cigar. The wrapper forming mechanism 23 comprises a rotary table 273 having spaced dies 274 thereon, a cutting roller assembly 275 for cooperation with the dies 274 to form a wrapper, ejector means 276, a pick-up or transfer device 277 for carrying a wrapper from the rotary table 273 to a predetermined position on the apron 187, and suitable vacuum connection means (not shown). The wrapper forming mechanism 23 is shown in FIGS. 1, 2, 10 and 19–32.

Referring now to FIGS. 19, 20 and 21, the main frame 25 has a top plate 280 with an opening 281 through which a sleeve 282 extends and is secured to the plate 280. A tubular member 283 is freely rotatable in the sleeve 282 and has an enlarged upper sleeve member 284 secured to its upper end, the sleeve 282 supporting the upper sleeve 284 for rotation relative thereto. The rotary table 273 is carried by the upper sleeve 284 and includes lower and upper plates 285 and 286 and a peripheral side member 287 securing the plates in spaced relation and forming a sealed chamber 288 therein. Communication between the tubular member 283 and the chamber 288 is established through openings 289 in the wall of the sleeve 284 or the like. A peripheral trough 290 may be secured to the rotary table 273 for scrap tobacco. A fixed plate 291 is spaced from the top plate 280 of the frame 25 on the forward side thereof. This fixed plate 291, or a receptacle next to it, may be used by the operator as a work table for leaves of tobacco from which wrappers are to be cut in the operation of the machine.

Each of dies 274 is secured to the upper plate 286 and has an upper cutting edge 292, and each die is circumscribed by a housing 293 secured at its periphery to the upper plate 286 and having a die contacting opening 294 sealably contacting the die below the cutting edge 292 thereon. The top plate 286 has perforations 295 so that the housing chamber 296 and the cavity 297 defined by the die 274 is in communication with the rotary table chamber 288. The housing 293 has a plurality of slots 298 radiating outwardly from the dies 274 through which a vacuum is formed to hold the tobacco leaf scrap thereon, as will appear.

As best shown in FIGS. 1, 19 and 44, the dies 274 are shaped to form a wrapper having longitudinal or elongated arcuate central peripheral portions "c" and rounded end portions "e." The shape of the wrapper is such that the same die 274 may be used to form either right-hand or left-hand wrappers, i.e. wrappers cut from the right-hand half of a tobacco leaf and from the left-hand half thereof. Accordingly, the rotary table mechanism 23 may be used for cutting either of these wrappers although the veins in the right-hand wrappers will still run at a different angle to the veins in the left-hand wrappers. For purposes of disclosure, the wrapper pattern also has a longitudinal or major dimension represented by line "m," and a cross or minor dimension represented by line "n."

The ejector mechanism 276 for each of the dies 274 comprises a central head or plate 299 with a peripheral side wall 299' defined by the die, the plate 299 having a plurality of perforations 300 therethrough in communication with the chamber 288 through cavity 297 and opening 295, FIG. 20. The plate 299 has a vertical rod 301 secured centrally thereto which extends downwardly through a bearing sleeve 302 secured in the bottom wall 285 of the rotary table 273. A spring retaining member 303 is secured adjacent to the lower end 304 of the rod 301 in spaced relation with the lower surface 305 of the sleeve 302, and a spring 306 extends between the member 303 and the surface 305 for normally biasing the plate 299 downwardly to a retracted position below the cutting edge 292 of the die 274, the rod 301 having a valve member 303' secured thereto above the sleeve 302. The lower end 304 of each rod 301 rides on the upper surface 307 of a fixed circular cam 308 adjustably secured to the top plate 280 by spaced rods 309 threaded into the cam 308 and plate 280 and held by fastening means 310.

The cam 308, FIG. 22, has a horizontal retracted rest portion "rr" in which the dies 274 of the rotary table moves from intermediate the wrapper transfer position to a point intermediate a wrapper leaf supply position. The actuated rest portion "ar" of cam 308 is an upper or raised horizontal portion extending on each side of the wrapper transfer position, and actuate and retract portions "a" and "r" interconnect the rest portions. Therefore, as the die 274 is carried from the wrapper leaf supply position past the cutting roller assembly 275 to the wrapper transfer position, the rod 301 rides up on the cam 308 to elevate the plate 299 to a position above the die 274, the side wall 299' of the ejector plate 299 extending downwardly in the die cavity 297 to guide the plate and hold a vacuum thereon. When the ejector plate 299 is raised, it carries the wrapper leaf above the die 274 to be picked up by the transfer device 277, and the vacuum in the cavity 297 is shut off by the valve plate 303' being moved to a closed position over the opening 295.

The dies 274 are diametrally spaced on the rotary table 273 so that one will be moved from ejecting to supply position while the other moves from supply to ejecting position. However, the rotary table 273 will only be actuated 180° for each complete cycle of the remainder of the machine to provide one wrapper for the single bunch that is formed. These supply and ejecting positions are predetermined stations between which the dies move each time the rotary table 273 is actuated. At the former a tobacco leaf is spread over the die 274 and the table then revolves to carry the die under roller assembly 275 to the wrapper transfer position from which the formed or cut wrapper is carried by the pick-up head mechanism 277 to the rolling table apron 187. It is apparent that the supply and transfer positions of the die 274 must be properly indexed to assure proper transfer of the wrapper to the pick-up head mechanism 277.

The rotary table 273 is supported subjacently for rotation by diametrally spaced roller assemblies 312, FIGS. 21 and 22, each of which includes spaced rollers 313 journaled in bearing members 314 adjustably secured to the top plate 280 by means 315. The axis of each roller 313 is on a radius of the rotary table 273.

The cutting roller assembly 275 is positioned intermediate to the wrapper leaf supply position and the wrapper transfer position of the dies 274 so that the dies will alternately pass under the cutting roller assembly as the rotary table 273 is actuated. One embodiment of the roller assembly 275 is shown in FIGS. 19, 23 and 24, in which each roller 317 is formed of a suitably hard material and has an axial length to extend radially across at least one longitudinal cutting edge "c" of each die 274 and across each end portion "e" thereof. Each roller 317 is journaled in a U-shaped frame 318, the frames being mounted side by side to an elongated upper mounting bracket 319 secured by vertical members 320 to the top plate 280 of the frame 25. The bracket 319 has spaced openings 321 therein through which elongated cap screws 322 extend and are threaded into the frames 318. Each frame 318 is spaced from the bracket 319 by at least two blocks of resilient material 323 and 324, the former being relatively compressible and the latter being relatively incompressible. As shown in FIGS. 23 and 24, the position of the blocks 323 and 324 is reversed for the rollers 317 so that the rollers are adapted to pivot in opposite directions to assume angular positions. The axes of the rollers 317 are mounted in spaced parallel relationship, but as the die 274 passes under the rollers 317, they are moved to the tilted position in which each roller bears against one longitudinal cutting edge of the die. The force exerted by the compressed block 323 maintains a firm cutting contact of the roller 317 acted on with only the one die cutting edge.

Another improved embodiment of a cutting roller assembly 275' is shown in FIGS. 25–27. In the assembly 275', a pair of rollers 326 are each journaled in end bearing links 327 secured to one end of a rod 328, the other end of which is mounted in bearings 329 in a base member 330 secured to the fixed plate 289. A link 331 is secured to the free end of each rod 328 and the end of the link 331 is biased downwardly by a tension spring 332 connected to a stud 333 on the base member 330. A boss 334 is also formed on the base member and each link 331 has an adjustable stop member 335 for engagement with the boss 334 thereby limiting the downward pivoting of the links 331 to control clockwise rotation of the rods 328, in FIG. 27, and the lowest position of the rollers 326. It is apparent that the rollers 326 are biased downwardly by tension springs 332, but that in the lowest position the links 327 and 331 are angularly positioned so that the rollers will move upwardly when contacted by the dies 274 passing under the rollers during rotation of the rotary table 273. Therefore, the rollers are pivotally mounted to move to an operative cutting position. The rollers 326 are preferably offset axially so that only one roller contacts one die cutting edge 292, but the rollers overlap to cut the end portions "e" of the dies.

A safety member 337 may be provided in front of the cutting roller assembly 275 or 275' to prevent the wrapper leaf operator from getting injured. The member 337 extends across the front of the rollers and is pivotally mounted on vertical rod 338. An end portion of the member is biased by spring 339 to an operative position and a micro-switch 340 is provided with cam 341 to actuate the switch 340 in the event the safety member is contacted. The power to the machine is wired through the micro-switch 340. It is also clear that the rollers 326 are free to swing upwardly away from the dies 274 against the force of springs 332 to facilitate easy cleaning and removal of anything that should happen to get caught under the rollers.

The rotary table 273 is rotated by a gear 343 secured to the tubular vacuum member 283, the gear 343 being driven through a gear train 344 from the main drive shaft 34, FIGS. 21 and 28–30. A worm gear 345 is secured to the main shaft 34 and is meshed with worm gear 346 on a vertical shaft 347 spaced laterally from the tubular member 283. The shaft 347 has a collar 348 thereon with a cam 349, and the upper portion of the shaft carries a segmented gear 350 having half the number of teeth thereon as the gear 343 for rotating the table 273. The worm gears 345 and 346 are in a 1:1 ratio so that one revolution of main shaft 34 effects one revolution of the shaft 347, but the segmented gear 350 will only mesh with half the teeth of gear 343 so that the rotary table 273 is only rotated 180°. The indexing means for stopping rotation of the rotary table 273 to assure that the dies 274 are properly positioned for wrapper transfer comprises a circular plate 351 secured to the tubular member 283 and having peripheral notches 352 on diametrically opposite sides thereof. A lock pin 353 is adapted to be positioned in the notches alternately to hold the rotary table in fixed position, the lock pin 353 being carried on the end of a lever 354 pivoted, at 355, to the frame and having a follower surface 356 for contact by the cam 349 to move the lock pin 353 out of the notch 352 to permit the segmented gear 350 to mesh with the gear 343 for rotating the table 273. The lever 354 is biased toward locking position with the circular plate notches 352 by a spring 357 or the like. Therefore, as the segmented gear 350 rotates into meshed condition with gear 343, cam 349 opens lock pin 353 so that the rotary table begins its 180° movement and lock pin 353 rides on the outer surface of the circular plate 357 until the notch 352 is aligned therewith so that the rotary table 273 is again locked in indexed position.

Referring now to FIGS. 1, 19, 31 and 32 the pick-up or transfer device 277 for transferring a wrapper from the die 274 of the rotary table 273 to the rolling table apron 187 will now be described. The pick-up device 277 comprises a vertical sleeve 360 secured to top plate 280 of the frame 25 a flanged collar 361, and a tubular member 362 extends through the sleeve 360 in sealed rotatable condition with packing members 363 at the ends of the sleeve. The lower end of the tubular member 362 is sealed and has a sprocket wheel 364 secured thereto forming a portion of the control means for the pick-up device 277. A lower end piece 365 of the tubular member is supported for vertical movement of the tubular member by another portion of the control means therefor. The side wall of the member 362 between the packing members 363 has an opening 366 in communication with the interior of the sleeve 360, which has a duct 367 therefrom leading to the vacuum means for the wrapper forming and transfer mechanism 23.

A right angle bend 368 is fastened to the upper end of the tubular member 362 and a horizontally extending arm or tube 369 is connected to the bend 368 and supports a pick-up head 370 on its other end. The pick-up head 370 has a construction similar to that of the sleeve and tubular members 360 and 362, comprising a T member 371 having a vertically positioned cylindrical wall and a lateral wall 372 in which the arm 369 is secured, an inner tubular member 373 with an opening 374 in communication with the interior of the arm 369, and sealing means 375 between the outer T and inner tubular members 371 and 373, FIG. 32. A top cover plate 376 closes the upper end of the tubular member 373, and a head member 377 having a shape substantially complementary to the wrapper formed by dies 274 is secured to the lower end of the tubular member 373, FIG. 19. The head member 377 has a chamber 378 and a plurality of perforations 379 are formed in its removable bottom wall 380 which is retained in assembled position by magnets 381 or the like. It is apparent that a vacuum passage is provided through perforations 379 in the wall 380 through arm 369, tubular member 362 and 367 to the vacuum source.

The pick-up head 377 is adapted to be moved from the wrapper transfer position of the rotary table dies 274 in a horizontal path to a wrapper deposit position above the rolling table apron 187 by rotating the tubular member 362, and the pick-up head 377 is then reciprocated downwardly and upwardly to deposit the wrapper in a predetermined position on the apron 187. The pick-up head rotation control means includes the sprocket wheel 364 on the tubular member 362 driven by a sprocket chain 382, which has sufficient play for limited vertical movement of the member 362. The sprocket chain 382 extends around a sprocket wheel 383 journaled on shaft 384 secured to the top plate 280. A link 385 is secured to the sprocket wheel 383 and one end of connecting rod 386 is pivoted to the link 385 and also connected to the upper end of lever 387. The lever 387 is pivoted at 388 to frame member 27 and has a follower 389 intermediate its ends, the follower 389 being positioned against cam surface 390 of the cam 49. The pick-up head vertical position control means includes a lever 392 having a shoe 393 at one end supporting the lower end piece 365 of the tubular member 362 and having its other end 394 pivoted to the frame 25. A follower 395 adjacent to the shoe end 393 of the lever 392 rides on the surface 396 of open cam 47.

The pick-up head 377 is also provided with means for controlling the position of the head relative to the arm 369, as shown in FIGS. 19, 31 and 32. The cover plate 376 sealing the chamber of the inner tube 373 projects laterally approximately along the minor dimension "n" of the wrapper pattern defined by the head 377 and has a pivot pin 397 to which one end of rod 398 is connected. The other end of rod 398 is pivoted to a link 399 by pin 400, and the link 399 is secured to the upper end of a vertical rod 401 which is adjustably secured in bore 402 of a block 403 mounted on the sleeve member 360. The axis of pin 400 is spaced from the axis of the rod 401 the same distance as the axis of the rod 401 is offset from the axis of the vertical tubular member 362 which carries the arm 369 and pick-up head 377 between the rotary table dies 274 and the rolling table apron 187. Accordingly, the axis of pin 400 and the tubular member 362 are aligned to maintain the pick-up head 377 in fixed position relative to the arm 369 to establish a right-hand wrapper leaf depositing position of the head with respect to the rolling table apron 187, as shown by the outline marked "R.H." in FIG. 19. However, if the machine is to employ left-hand wrapper leaves which have veins at a different angle from the veins in the right-hand wrappers, the depositing position of the pick-up head 377 must be turned relative to the right-hand wrapper depositing position during swinging movement of the head 377 to the apron 187 and yet provide an indexed position of the pick-up head 377 over the wrapper transfer position of the dies 274. Accordingly, the rod 401 and link 399 are manually adjusted to the dotted position in FIG. 19 and the length of the rod 398 is adjusted. Accordingly, in the left-hand leaf transfer position the head 377 is pivoted to deposit the left-hand wrapper on the apron 187 in the outline marked by the letters "L.H."

Referring again to FIG. 31, the follower 389 is shown approaching the actuate portion "a" of the cam 49 for swinging the pick-up head 377 from the rotary table die 274 to the apron 187. In the retracted rest portion "rr" the pick-up head is superposed with respect to the wrapper transfer position of the die 274 and the rod 301 rides up on the cam surface 307 to move the ejector plate 299 into contact with the bottom plate 380 of the pick-up head 377, FIG. 20. The valve plate 303' on the rod 301 has also moved into abutment with the lower surface of the upper plate 286 to close the opening 295 whereby vacuum is shut off from the cavity 297. At this time, a vacuum is developed in the pick-up head 377 through suitable valving (not shown) of the vacuum means so that the wrapper leaf is transferred from the ejector plate 299 of the die 274 to the bottom plate 380 of the head 377.

In the actuate portion "a" of the cam 49, the pick-up head 377 is swung to an indexed position over the apron 187 and remains in this position for the rest period "ar" of the cam 49. During this rest period the follower 395 of the elevation mechanism drops into the depressed or actuate portion "a" of cam 47 so that the pick-up head 377 is lowered and then raised after a brief rest "ar."

Through the valving of the vacuum means, the vacuum holding the wrapper onto the head 377 is shut off and vacuum is placed on the apron 187, as will appear, so that the wrapper is held on the rolling table. When the pick-up head is raised, the retract portion "r" of the cam 49 is followed by the rotation means for the pick-up mechanism so that the head 377 is again returned to its retracted rest position over the rotary table 273.

*Rolling table mechanism.*—The rolling table mechanism 22 is positioned in transverse alignment with the bunch forming mechanism 21 and is longitudinally offset from the wrapper forming mechanism 23 to receive fillers or bunches from the former and wrappers from the latter, and is actuated to roll the wrappers around the filler material to make cigars, suitable adhesive being applied to the wrappers prior to the rolling operation. The rolling table mechanism comprises the flexible apron 187, a forming table 406, a forming roller 407, apron tightening means 408, forming roller control means 409, apron control means 410 and suitable vacuum means (not shown).

As shown in FIGS. 10, 11, 13, 14, 33, 34, 36 and 37, the forming table 406 includes a head plate 412 dovetailed, as at 413, with a vacuum housing 414 secured to side plates 415 fastened to the frame members 156 extending across the main frame 25. The vacuum housing 414 has an inlet conduit 417 connected to vacuum means through a suitable valve (not shown), and the forward end of the apron 187 is secured to the housing 414 by a plate 418 or the like. The head plate 412 is provided with a depression 419 (FIG. 34) having a predetermined angularity or concavity in the walls thereof and a plurality of channels 420 are formed in the head plate 412, the bottom of each of which is in communication with the vacuum housing 414 through elongated perforations 421 or the like. As will become more apparent hereinafter, the channeled upper working face of the head plate 412 has a vacuum thereon at all times except during a brief portion in the operation of the machine when the wrapper from the rotary table 273 is being deposited thereon. The apron 187 is unattached along the sides, and its rearward margin is secured to the apron tightening means 408. As shown best in FIGS. 1 and 19, the apron 187 is perforated at 422 to provide passages in communication with the head plate 412, the perforations 422 being in the right and left-hand leaf patterns "R.H." and "L.H."

The forming roller 407 extends across the forming table 406 and is movable from a fully retracted position (shown in solid lines in FIG. 33) spaced rearwardly of the table to a fully actuated rest position (shown in broken lines in FIG. 33), as will be described hereinafter. The roller 407 has frusto-conical portions 424 and 425 forming a concave central area, the angularity of which is predetermined. The concavity of the head plate working surface and the roller 407 is substantially complementary to the desired shape of the cigar to be formed by the machine. Each end of the shaft 426 for the roller 407 is carried by a carriage assembly 427, which is pivotally connected by a link 428 (FIG. 33) to an arm 429 forming a portion of the forming roller control means 409. Each carriage assembly 427 (FIG. 35) comprises a bearing block 430 in which the shaft 426 is journaled, the bearing block 430 having vertical side V-grooves 431 and being supported for vertical movement between a pair of guide blocks 432. The guide blocks 432 are secured to a plate 433 and the bearing block 430 is biased downwardly by a spring 434. The plate 433 has a pair of spaced wheels 435 mounted thereon, the wheels riding on a track 436 formed in a carriage guide member 437 secured to the side plate 415 of the forming table 406. The track 436 has a lower rearward portion in which the forming roller 407 is in retracted position behind and below the head plate 412, an upper forward portion in which the actuation of the forming roller to roll a cigar takes place, and an angular portion connecting the other portions for moving the forming roller 407 above the head plate 412 to the upper position.

Referring particularly to FIGS. 33 and 34, the control means 409 for the forming roller 407 includes the arms 429, which are secured to a cross shaft 439 journaled in bearings 440 secured to the frame member 156. A spur gear 441 is fastened to the shaft 439 and is meshed with a larger spur gear 422 on a stub shaft 443 carried in bearings 444. A lever arm 445 is also secured to the shaft 443 and the other end of the lever arm has a follower 446 positioned on cam surface 447 of the cam 41. Inasmuch as the actuation of the forming roller control means 409 and the apron control means 410 are cooperable to perform the cigar rolling operation, the description of the forming roller operation will be set out hereinafter.

The apron tightening means 408 is also related to the operation of the rolling table mechanism 22 and will now be described in detail with reference to FIGS. 11, 14, 36 and 37. The rearward margin of the apron 187 extends around and is secured to a cross bar 450 fastened to a cross shaft 451 rotatably mounted in side plates 452 of a swivel control mechanism 453 forming a portion of the apron control means 410. One end of the shaft 451 has a sprocket wheel 454 secured thereto, and a sprocket chain 455 extends around the wheel 454 and around another sprocket wheel 456 rotatable on a lower frame piece of the main frame 25. A clamp 457 pivotally secures one end of a lever 458 to the chain 455 and the other end of the lever is pivoted to the frame. A follower 459 intermediate the ends of lever 458 is positioned for lever control with the cam 39, which is a combination open and closed cam. It is apparent that upward movement of the lever 458 will carry the chain 455 counterclockwise in FIG. 36 to cause the shaft 451 and bar 450 to rotate in the same direction thereby loosening the apron 187. The precise tightening and loosening of the apron will be described hereinafter.

Referring specifically to FIGS. 37 and 38, the apron control means 410 includes the swivel control mechanism 453, which has the side plates 452 supporting the shaft 451 and a base member 460 mounted on a central vertical pivot 461. A tension spring 462 is connected between one side of the base member 460 and the frame to exert a predetermined force tending to turn the bar 450 to an angular position whereby the tension on one side of the apron will be increased and the other side of the apron will be loosened. The spring 462 is shown connected to the right-hand side of the base member 460 to draw that side rearwardly as shown in FIG. 39c, and the apron control means 410 also includes the cam 44 having a closed cam surface 463 in which is positioned a follower 464 intermediate the ends of a lever 465. One end of lever 465 is pivotally connected by pin 466 to a frame member 467 and the other end of the lever has a cable, chain or the like 468 connected thereto. The cable 468 is wound around and secured to a small drum 469, which is connected to a larger drum 470 and both are mounted on a shaft 471, FIG. 38. The larger drum 470 has one end of a cable 472 fastened to it and the cable 472 is wound around the large drum and secured to the base member 460 on the same side thereof as the spring 462, but through cam 44 exerting a force to overcome the spring tension and position the swivel member 453 as shown in FIGS. 39a, b, d and e to control the apron 187 during a cigar rolling operation.

In the positions of cams 41 and 44 as shown in FIGS. 33 and 37, respectively, the forming roller control means 409 and the apron control means 410 are beginning the retracted rest portions "rr" of a cycle of operation, the forming roller 407 being retracted to a position behind and below the bunch depositing position of the transfer box 124 with respect to the apron 187 and the bar member 450, 453 extending straight across the rolling table mechanism 22 perpendicular to the path of movement of the forming roller 407 so that the tension on the apron 187 will be substantially even from side to side. During the retracted rest portion "rr" of cams 41 and 44, the transfer box 124 is moved to the bunch depositing position and the knock-out device 125 is actuated and retracted to deposit a bunch on the apron 187 forwardly of the forming roller 407. At this time, the pick-up head device 277 moves to wrapper depositing position with respect to the perforations 422 of the apron 187 and retracts to the rest position "rr" over the rotary table 273. Immediately thereafter, but within the retracted rest portion of the cams 41 and 44, the adhesive control mechanism 24 is actuated to deposit an adhesive on the wrapper, as will appear.

During the retraction portion "r" of the forming roller 407, the cam follower 459 for cam 39 of the apron tightening means 408 moves into the open portion "o" so that the weight of the lever 458 causes the chain 455 to rotate the shaft 451 and bar 450 in a clockwise direction thereby tightening the apron 187 to its tightest condition to pull the apron over the roller 407, FIG. 39e, which then rides directly on the head plate 412 of the forming table 406. In the FIG. 36 position of cam 39, the follower 459 is starting on an apron loosening portion "l" of its cycle so that the knock-out device 125 will be able to form a loop in the apron 187 into which the bunch will be deposited from the transfer box 124. The open or outer face of cam 39 is followed by follower 459 to the actuate portion "a" of the cam where the follower moves into the closed cam portion "c" for the actual rolling operation. Although the apron 187 appears to be loosened at this portion of the machine operation, the apron becomes doubled on itself to form a closed loop or bight 473 whereby the tension is actually greater during this portion of the machine cycle, FIG. 39b.

Referring again to FIGS. 33, 36 and 37, and to FIGS. 39a-e where the cigar rolling steps are shown diagrammatically, the cam 41 has actuation and rest portions "a-1" and "ar-1" in which the lever 445 is moved to the left to rotate gear 442 clockwise and gear 441 counterclockwise to rock arms 429 forwardly to carry roller 407 to the position shown in FIG. 39a, at which position a preforming operation on the bunch can be effected using suitable dies (not shown). The actuation and rest portions "a-2" and "ar-2" of the cam 41 moves the forming roller 407 upwardly and forwardly to a position at the rearward edge of the forming table 406 whereby the loop 473 formed in the apron 187 to hold a bunch is closed around the bunch and the apron is tightened as previously described, see FIG. 39b. The rest portion "ar-2" provides a time interval for the swivel control mechanism 453 to be actuated so that the bar 450 is turned to the position shown in FIG. 39c. When the roller 407 is in its "ar-2" rest period, the follower 464 of cam 44 moves into its "rsa" or right side actuation cycle in which the lever arm 465 is moved upwardly to permit the spring 462 to pull the right side of the mechanism 453 rearwardly whereby the loop 473 of the apron 187 is closed on the right side thereof and is loosened on the left side. The cam 44 then moves into the "ar-1" rest portion which maintains the right side of the apron tightened while the cam 41 is moving through the third actuation portion "a-3" in which the bunch is rolled into the right half of a right-hand wrapper leaf. During the rest portion "ar-3" of the cam 41, the cam 44 actuates swivel control mechanism 453 in the "lsa" portion to reverse the angular position of the bar 450 whereby the left side of the apron loop 473 is closed and the right side is opened, FIG. 39d. The bar 450 is maintained in this position during the rest portion "ar-2" of cam 44 during which time the cam 41 moves into actuation portion "a-4" to finish rolling the bunch into the left half of the right-hand wrapper leaf. During the rest portion "ar-4," the forming roller 407 is held in fully actuated position while cam 44 passes through the retract portion "r" to straighten out the roller 407, and at this time the apron 187 is further tightened by follower 459 moving into the open portion "o" of cam 39, FIG. 39e.

It is apparent that a left-hand wrapper may be formed about a bunch by connecting the spring 462 and cable 472 to the left side of the base member 460, or in reverse as shown in broken lines in FIG. 93e so that the same rolling action, acting in reverse, is provided. It is also apparent that the cigar formed is shaped by the concavity of the head plate 412 and forming roller 407 as well as the manner in which the apron 187 is tightened to form a conical bight 473 substantially complementary to the desired shape of the cigar.

The valving of the vacuum means is timed for the operation of the pick-up head 377 so that a vacuum will be created when the die 274 is indexed at the wrapper transfer station and the wrapper is pressed against the head 377. At this time the vacuum in the ejector means 276 is shut off by the valve plate 303' and the vacuum in the die housing chamber 296 is still on to hold the scrap in place through the slots 298 while the wrapper is transferred, the scrap being removed during rotation of the die 274 to the leaf supply station. When the pick-up head 377 is swung to its indexed wrapper depositing position over the apron 187, the vacuum in housing 414 of the rolling table mechanism 22 is shut off for a brief period during which time the pick-up head is lowered to place the wrapper over the perforations 422 of the apron. The vacuum in the pick-up head is shut off and a vacuum is again created in the vacuum housing 414 at this time, and the pick-up head 377 is then again raised and moved to retracted rest position.

*Adhesive depositing mechanism.*—The mechanism 24 is provided to deposit a suitable amount of adhesive in a predetermined pattern on the wrapper leaf prior to the actuation of the rolling table mechanism 22 so that the wrapper will remain rolled about the bunch. Referring to FIGS. 1, 16 and 21, an improved adhesive mechanism 24 may consist of a brush, sponge or the like 475 having a suitable shape and being carried on a rigid plate 476 mounted on a vertical pivot pin 477, which is journaled in one end of arm 478. The other end of arm 478 is secured to a vertical shaft 479 rotatably and slidably mounted in a vertical sleeve 480 secured to a frame member 481, and a spur gear 482 is mounted adjacent to the lower end 483 of the shaft 479. The lower end 483 of the shaft 479 rides on a shoe 484 on one end of a lever 485 pivoted intermediate its ends at 486 to vertical frame member 28 and having a follower 487 on its other end, the follower 487 being in contact with the peripheral surface 488 of cam 46 for controlling the elevation of the shaft 479, arm 478 and brush 475. A horizontal rack 489 is slidably mounted relative to the frame 25 and is engaged with the spur gear 482 for controlling the rotation of shaft 479 and arm 478 to swing the brush 475 from a retracted position to an adhesive depositing position superposed with the wrapper position on the apron 187. The rack 489 (FIGS. 16 and 41) is secured to a guide plate 490 having an elongated opening 491 with side margins 492 slidable on bearing surfaces 493 of a bushing 494 on the main drive shaft 34. A follower 495 is also mounted on the guide plate 490 and it is positioned in closed cam surface 496 of the cam 46.

As shown in FIG. 1, when the adhesive brush head 475 is in retracted position or at rest, it is to the left of the rolling table apron 187 and forwardly thereof. An adhesive receptacle 498 is mounted on the frame and supports a roller 499 against which the brush is adapted to move to pick up a layer of adhesive. The brush 475 is rotated from retracted position by the rack 489 controlled by surface 496 of cam 46 to the apron 187, and the follower 487 then moves into the actuation depression "a" of surface 488 to lower the brush 475 into contact with a wrapper leaf on the apron. The brush is then raised again and swung back to retracted position "rr." The elevation of the upper surface of the roller 499 is shown in position to be contacted by the brush 475 in both directions of travel, but the cam surface 488 may also be formed so that the brush by-passes the roller 499 during retraction and contacts it only during actuation portion "a" of surface 496. It may also be desired to actuate the brush 475 both before and after the wrapper leaf is transferred to the apron 187 so that adhesive will be applied to both sides of the wrapper leaf by first applying adhesive directly to the apron. If so, the cam 46 may be provided with other actuation and retraction portions opposite to those shown in FIG. 40.

The brush 475 is shown in FIG. 1 to be in position to apply adhesive to a right-hand wrapper leaf. However, linkage is provided to adjust the pivotal points of the brush so that during movement to the adhesive depositing position it will turn about pivot pin 477 to assume an indexed position above the apron 187 corresponding to the left-hand wrapper leaf position "L.H.," FIG. 19. The pivot pin 477 has a link 500 rigidly secured thereto and a connecting rod 501 is pivoted to the link 500 and its other end is pivoted to a pin 502 secured in axial alignment with the axis of shaft 479. This arrangement is provided for holding the brush 475 in fixed position for applying an adhesive to right-hand wrappers on the apron 187. However, another mounting member 503 for the pivot pin 502 is spaced from the shaft 479 by a frame piece 504 so that the pin 502 can be moved to this position and the connecting rod 501 may be adjusted so that the brush 475 will be adjusted in movement to coincide with the left-hand leaf position.

Another improved adhesive means is shown in FIGS. 1, 19 and 43, in which the free end of the arm 478' is provided with a spray nozzle 506 having air and adhesive inlets connected to valves 507 and 508, respectively. An air line 509 is connected to an air pressure source (not shown) and another conduit 510 connects the adhesive valve 508 to a reservoir (not shown) from which adhesive is pumped under pressure to the valve. The valves 507 and 508 are controlled by cam actuated microswitches 511 and 512, respectively, on the shaft 85, FIG. 6. The air valve 507 operated through micro-switch 511 is opened so that air is blown through the nozzle 506 prior to the actuation of the valve 508 for flowing adhesive into the nozzle to be ejected therefrom, and the air remains on after the adhesive supply is again shut off so that the nozzle will remain clean.

A predetermined spray pattern is provided so that adhesive will be applied on the wrapper leaf, but preferably not on the apron 187 behind the wrapper. It is apparent that the elevation of the spray nozzle 506 above the apron 187 should remain constant to provide a substantially even concentration of adhesive on the wrapper. Accordingly, for applying adhesive to a right-hand leaf, the arm 478' is merely swung on a pivot shaft 513 from a retracted position (line "ma—ma" in FIG. 1) in a continuous path sweeping across the wrapper position on the apron and adhesive is ejected during movement of the nozzle to cover the wrapper in the pre-selected pattern. At the end of the actuation portion of the spray adhesive device (toward the line "mb—mb" in FIG. 1), the arm is retracted to inoperative position. Inasmuch as the nozzle 506 remains at a constant height a pivot shaft 514, for left-hand leaf adhesive can be located at a position spaced laterally from the pivot point 513 in substantially the same location with respect to the left-hand leaf position as the pivot point 513 occupies with respect to the right-hand leaf position of the apron 187, FIG. 19. In the same manner as the shaft 503 may be driven from the shaft 479 by a suitable chain and it is only necessary to remove the arm 478 from the shaft 479 and secure it to shaft 503 in order to change from right to left-hand leaf operation of the machine, similarly the arm 478' may be moved between pivot shafts 513 and 514 for right and left-hand leaf operation and both shafts driven by a suitable chain drive.

The spray adhesive means is particularly desirable in the present machine inasmuch as it obviates the need for actual contact of a brush with the wrapper leaf and permits precise adhesive control. The spray means permit spliced wrappers to be used for rolling cigars; that is, the use of pieces of wrapper tobacco not large enough for an entire wrapper may be cut on the wrapper forming rotary table and vacuum transferred to the rolling table. Splicing cannot be done with conventional equipment or using an adhesive brush because the pieces would be misaligned or carried off by the brush or sponge.

Although paste or adhesive remaining on the apron for any length of time in which the apparatus is inoperative will cause a gum condition to result preventing the rolling of cigars and requiring a thorough cleaning, adhesive placed on the apron during continued cigar making operation facilitates the smooth operation of the rolling table apron and prevents gumming or staining of the apron by the tobacco. Accordingly, by applying adhesive both before and after the wrapper is positioned on the apron a smoother, better made cigar is produced.

When the wrapper is laminated or wrapped on itself about the bunch, the adhesive binds the wrapper to itself and to the bunch to act as a substitute for a binder leaf and provide a strongly made cigar. It is also within the scope of the present invention to provide means for applying adhesive only to the periphery of the wrapper leaf so that when the cigar is formed, a smoother exterior appearance will be provided.

When a double adhesive deposit is desired using the spray means, the nozzle 506 is positioned on line "mb—mb" of FIG. 1 in its retracted position and is actuated to line "ma—ma" position to deposit adhesive on the apron. The transfer mechanism 277 is then actuated to carry a wrapper to the apron 187, the transfer mechanism then returning to the rotary table 273 and the nozzle 506 being actuated from its remote position on line "ma—ma" to its retracted position on line "mb—mb."

Operation

In a single revolution of main shaft 34, the cooperable mechanisms of the present machine function to produce a single rolled cigar. A filler is formed by building up a vertical stack of strips of tobacco or the like in the cross feed 20, which is actuated periodically in timed relationship with the operation of the bunch forming mechanism 21 to deliver the filler or bunch tobacco thereto. Variable length actuation of the cross feed mechanism 20 may be effected to produce fillers of different lengths, and cross feed actuation is provided only when the amount of tobacco in the bunch forming mechanism 21 is below a predetermined level.

The filler material delivered to the bunch forming mechanism is severed by the vertical knife 111 which is adjustably positioned at an angular position relative to the direction of cross feed actuation to provide predetermined taper at the ends of a cigar produced. Of course, cylindrical cigars may be produced by the present machine and a knife extending perpendicular to the direction of cross feed would be desired. The filler material is stacked in the vertical reservoir 130 having side walls substantially complementary to the shape of the filler material, the transfer box 124 defining the bottom of the reservoir. The filler tobacco is compressed and severed horizontally by the V-shaped knife 123 to form a bunch for a cigar, and the transfer box 124 is then actuated to a bunch depositing position over the rolling apron 187 of the rolling mechanism 22. Knock-out means 125 is reciprocated through the box 124 to form a loop in apron 187 and to assure complete bunch tobacco discharge into the apron loop forwardly of the cigar forming roller 407. When the box 124 is retracted to its reservoir position and the knife 123 is retracted, the spray means 216 is actuated to form a mist on the knife whereby high moisture tobacco may be used without gumming.

The wrapper forming mechanism 23 includes the rotary table 273 having spaced dies 274 alternately operative with successive cycles of the rest of the machine to form a wrapper from either right or left-hand portions of a tobacco leaf. Cutter rollers cooperate with the dies 274 and are pivotally mounted on fixed bases to form the wrapper, and the transfer mechanism 277 is operative in timed relation with the rotary table 273 and the rolling table mechanism 22 to transfer a wrapper from the die 274 to a predetermined position on the rolling apron 187. Either right-hand or left-hand wrapper leaf transfers may be made to angularly related positions on the apron 187 from a single indexed die position of the rotary table.

Similarly, automatic paster mechanism 24 is operative in timed relationship with the transfer mechanism 277 and rolling table mechanism 22 to deposit adhesive in a predetermined position on either the apron 187 or the wrapper, or on both the apron and the wrapper.

The rolling table mechanism 22 includes the forming roller 407, which is actuated subsequent to wrapper and adhesive deposit to close the apron loop around the bunch of filler tobacco and carry the bunch in a series of steps across the wrapper to form a single cigar. Mechanism 410 effectively controls the angular position of the forming roller 407 relative to its direction of actuation to form a cigar of predetermined configuration, and it is apparent that a variety of cigar shapes may be formed. Cylindrical cigars require straight line actuation of the roller 407 only. The apron tension is also controlled by means 408 which at the end of forming roller actuation draws the apron to its tautest condition to raise the roller and discharge a cigar from the apron onto suitable mechanism for trimming and cutting the cigar to suitable lengths. In this manner, more than one cigar may be formed by a single operation of the present machine.

It is now apparent that a greatly improved cigar making machine has been provided, one which is adapted to form cigars from tobacco having a high moisture content and having cooperable mechanisms for rapidly and accurately forming cigars. Cigars of different shapes and lengths may be formed by minor alterations in the mechanisms, and the present apparatus employs a universal wrapper pattern for left-hand and right-hand leaves and is adapted to roll cigars using wrappers formed with either the right-hand or left-hand half of tobacco leaves.

Changes and modifications are contemplated, which will be readily apparent to all those skilled in the art, and the scope of the present invention is to be limited only by the claims which follow.

What we claim is:

1. In a cigar making machine including elongated wrapper and adhesive transfer members, and means for moving one of said transfer members between a first indexed position and one of second and third angularly-related indexed positions, said means comprising an arm rotatable about a fixed axis, said transfer member being pivotally mounted on said arm in spaced relation with the fixed axis thereof, a link secured to said transfer member, an adjustable control rod having one end pivoted to said link at a point spaced from the pivot axis of said transfer member, the other end of said control rod being adapted to be pivotally connected in one of first and second pivot positions, the first of which coincides with the fixed axis and the second of which is spaced from the first pivot position a predetermined distance.

2. In a cigar making machine including elongated wrapper and adhesive transfer members, and means for rotating one of said transfer members between a first indexed position having a center point and one of second and third angularly-related overlapping positions having a common center point, said means comprising an arm having one end rotatably mounted on a fixed axis and pivotally carrying said transfer member on its other end, drive means for rotating said arm a predetermined number of degrees to move the pivot axis of said transfer member between alignment with the center point of said first indexed position and alignment with the center point of the second and third indexed positions, and control means for positioning said transfer member relative to said arm, said control means comprising a first link secured to said transfer member and having a pivot spaced laterally from the pivot axis of said transfer member, an adjustable connecting rod having one end connected to the pivot of said first link, other means forming first and second spaced pivot points at which the other end of said adjustable connecting rod is adapted to be pivotally positioned, said first pivot of said other means coinciding with the fixed axis of said arm for maintaining said transfer member in a non-pivoting condition on said arm and the second pivot of said other means being spaced from the fixed axis of said arm to effect pivoting movement of said transfer member relative to said arm during actuation of said arm between the first and the second and third indexed positions.

3. In a cigar making machine having a rolling table with a flexible apron having angularly related first and second wrapper receiving positions, and roller means for rolling a tobacco bunch in a wrapper on one of said wrapper positions of said apron; adhesive applying means for depositing adhesive in a predetermined pattern on at least one of the wrapper and apron comprising an arm, adhesive carrying means on the arm and being swingable from a retracted position laterally of said apron to a position over said apron, means for rotating the arm and selectively controlling movement of the adhesive carrying means in predetermined patterns over said apron corresponding to said first and second wrapper receiving positions thereon, said last-mentioned means including first and second spaced pivot positions from which movement of said adhesive carrying means in said patterns is selectively controlled whereby adhesive may be deposited in either of the first and second wrapper positions of said apron.

4. The adhesive applying means according to claim 3 wherein said adhesive carrying means is elongated and is adapted for surface contact with the surface to receive adhesive, and adhesive reservoir having a transfer roller and said adhesive carrying means being in adhesive receiving contact with said transfer roller during a portion of movement of the adhesive carrying means selectively to one of said first and second wrapper positions, gear and rack means for rotating the arm, cam means for controlling the rack including a closed cam surface for controlling rotation of the arm by said rack and a peripheral cam surface on said cam means for reciprocating said adhesive carrying means into adhesive depositing contact when in the selected wrapper position thereof.

5. The adhesive applying means according to claim 3 wherein said adhesive carrying means is elongated and is rotatably mounted on said arm, and said means for controlling movement of the adhesive carrying means including a link secured to the adhesive carrying means and a control rod pivotally connecting said link to one of said first and second spaced pivot positions, said first pivot position being axially aligned with the axis of rotation of said arm.

6. The adhesive applying means according to claim 3 wherein said adhesive carrying means comprises an air blown adhesive spray nozzle fixed to said arm, said first and second pivot positions being laterally spaced relative to the direction of rolling action of said roller means, and said arm being selectively mounted on one of said first and second pivot positions whereby said nozzle is adapted to be moved in angularly related patterns over said apron.

7. A cigar machine for making cigars having similar wrappers formed from both right and left-hand portions of tobacco leaves, comprising a cigar rolling mechanism including a flexible apron having a bunch position and right and left-hand wrapper positions, said right and left-hand wrapper positions being angularly related and overlapping, means for successively depositing single tobacco bunches on the bunch position of the apron, wrapper forming means having an indexed transfer position, elongated transfer means for successively depositing single wrappers on the apron, said transfer means being adjustable to selectively transfer single wrappers to either the right or left-hand wrapper position and, in either position of adjustment, receiving wrappers from said indexed transfer position, adhesive means for depositing adhesive on the wrapper and including an adhesive head, a laterally swinging arm carrying said head, and means comprising a link and selective pivots therefor for selectively controlling movement of said head to correspond to the right or left-hand wrapper position, and means for successively rolling single bunches in single wrappers to form cigars.

8. In a cigar making machine having a rolling table with a flexible apron and roller means for a rolling tobacco bunch in a wrapper on said apron; adhesive applying means for depositing adhesive in a predetermined pattern on the apron prior to the positioning of a wrapper thereon and for depositing adhesive in a similar pattern on a wrapper deposited on the apron, said adhesive applying means comprising an adhesive spray nozzle, an arm supporting said nozzle on one end and movable between a retracted position and a remote position, means for actuating said arm from its retracted position to its remote position before a wrapper is positioned on the apron and for returning said arm from the remote position to the retracted position after a wrapper is positioned on the apron, and means for discharging adhesive from said nozzle in a predetermined portion of each of the actuation and return cycles.

9. In a cigar making machine according to claim 2, in which said control means for positioning said transfer member relative to said arm includes said other means comprising a second link having a fixed axis spaced laterally from the fixed axis of said arm and having a pivotal connection with the other end of said connecting rod, the pivotal connection of said second link being movable between said first and second spaced pivot points.

References Cited in the file of this patent

UNITED STATES PATENTS

| | | |
|---|---|---|
| 200,055 | Haefnel | Feb. 5, 1878 |
| 286,901 | Canfield | Oct. 16, 1883 |
| 473,108 | Bauer | Apr. 19, 1892 |
| 521,749 | Williams | June 19, 1894 |
| 574,465 | Vale | Jan. 5, 1897 |
| 828,062 | Sherwood | Aug. 7, 1906 |
| 1,147,342 | Rosenthal | July 20, 1915 |
| 1,188,549 | Marsh | June 27, 1916 |
| 1,191,592 | Hansen | July 18, 1916 |
| 1,523,799 | Bronander | Jan. 20, 1925 |
| 1,586,330 | Rundell | May 25, 1926 |
| 1,645,012 | Kitchel | Oct. 11, 1927 |
| 1,787,583 | Larson | Jan. 6, 1931 |
| 1,805,694 | Halstead | May 19, 1931 |
| 1,838,115 | Schussler | Dec. 29, 1931 |
| 1,894,879 | Lay | Jan. 17, 1933 |
| 1,909,672 | Hamersley | May 16, 1933 |
| 1,944,577 | Rose | Jan. 23, 1934 |
| 1,948,598 | Rundell | Feb. 27, 1934 |
| 1,979,135 | Altenburger et al. | Oct. 30, 1934 |
| 1,981,469 | Rundell | Nov. 20, 1934 |
| 1,997,928 | Granstedt | Apr. 16, 1935 |
| 2,157,536 | Halstead | May 9, 1939 |
| 2,173,135 | Von Zimmerman | Sept. 19, 1939 |
| 2,276,289 | Clausen | Mar. 17, 1942 |
| 2,284,472 | Halstead | May 26, 1942 |
| 2,316,828 | Wheeler | Apr. 20, 1943 |
| 2,319,221 | Ferenci | May 18, 1943 |
| 2,337,542 | Carlson | Dec. 28, 1943 |
| 2,343,946 | Wheeler | Mar. 14, 1944 |

(Other references on following page)

UNITED STATES PATENTS

| | | | |
|---|---|---|---|
| 2,356,637 | Wheeler | Aug. 22, | 1944 |
| 2,359,034 | Granstedt | Sept. 26, | 1944 |
| 2,391,294 | Clausen | Dec. 18, | 1945 |
| 2,464,896 | Schreiber | Mar. 22, | 1949 |
| 2,570,444 | Henkel | Oct. 9, | 1951 |
| 2,587,163 | Jackson | Feb. 26, | 1952 |
| 2,592,065 | Petri | Apr. 8, | 1952 |
| 2,611,372 | Peterson | Sept. 23, | 1952 |
| 2,667,173 | Wheeler | Jan. 26, | 1954 |
| 2,754,699 | Pulman | July 17, | 1956 |
| 2,770,216 | Schock | Nov. 13, | 1956 |
| 2,808,058 | Halstead | Oct. 1, | 1957 |
| 2,945,498 | Valdespino | July 19, | 1960 |
| 2,956,567 | Wheeler | Oct. 18, | 1960 |

FOREIGN PATENTS

| | | | |
|---|---|---|---|
| 507,947 | Belgium | Jan. 15, | 1952 |
| 161,505 | Sweden | Nov. 26, | 1957 |